United States Patent
Xue et al.

(10) Patent No.: US 12,317,316 B2
(45) Date of Patent: May 27, 2025

(54) METHOD AND APPARATUS FOR CONTINUOUS CHANNEL RESERVATION FOR SIDELINK COMMUNICATION

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 17/585,128

(22) Filed: Jan. 26, 2022

(65) Prior Publication Data

US 2023/0239920 A1 Jul. 27, 2023

(51) Int. Cl.
*H04W 74/0808* (2024.01)
*H04W 28/26* (2009.01)
*H04W 72/20* (2023.01)

(52) U.S. Cl.
CPC ....... *H04W 74/0808* (2013.01); *H04W 28/26* (2013.01); *H04W 72/20* (2023.01)

(58) Field of Classification Search
CPC ......... H04W 74/0808; H04W 72/0406; H04W 28/26
See application file for complete search history.

(56) References Cited

U.S. PATENT DOCUMENTS

| | | | | |
|---|---|---|---|---|
| 11,979,906 | B2* | 5/2024 | Liu | H04B 17/318 |
| 2020/0120710 | A1* | 4/2020 | Viorel | H04W 16/14 |
| 2020/0351669 | A1* | 11/2020 | Xu | H04W 72/56 |
| 2022/0070935 | A1* | 3/2022 | Xue | H04W 80/02 |
| 2022/0132560 | A1* | 4/2022 | Li | H04B 7/0404 |
| 2023/0063943 | A1* | 3/2023 | Ding | H04W 72/02 |
| 2023/0064680 | A1* | 3/2023 | Huang | H04L 1/1848 |
| 2023/0087110 | A1* | 3/2023 | Hu | H04W 74/0808 370/329 |
| 2023/0138096 | A1* | 5/2023 | Zhao | H04W 72/40 370/329 |
| 2023/0217493 | A1* | 7/2023 | Yi | H04W 74/0866 370/329 |
| 2023/0232457 | A1* | 7/2023 | Hu | H04W 72/40 370/329 |
| 2023/0239920 | A1* | 7/2023 | Xue | H04W 72/20 370/329 |
| 2023/0328784 | A1* | 10/2023 | Lei | H04W 72/25 370/329 |

(Continued)

*Primary Examiner* — Parth Patel
(74) *Attorney, Agent, or Firm* — Dalei Dong; Holland & Hart LLP

(57) ABSTRACT

Methods, systems, and devices for wireless communications are described. A user equipment (UE) may obtain a channel occupancy time (COT) in an unlicensed frequency spectrum band. The COT may include an initial time interval for an initial transmission and a subsequent time interval for a subsequent transmission. In the initial time interval, the UE may transmit control information and data to another UE, where the control information indicates the subsequent time interval. The other UE may selectively perform communications during the subsequent time interval. The UE may perform the subsequent transmission during the subsequent time interval.

29 Claims, 14 Drawing Sheets

(56) References Cited

U.S. PATENT DOCUMENTS

2023/0345529 A1\* 10/2023 Van Phan ......... H04W 74/0808
2023/0371073 A1\* 11/2023 Liu ................... H04W 74/0816
2024/0129935 A1\* 4/2024 Dong ...................... H04W 4/40

\* cited by examiner

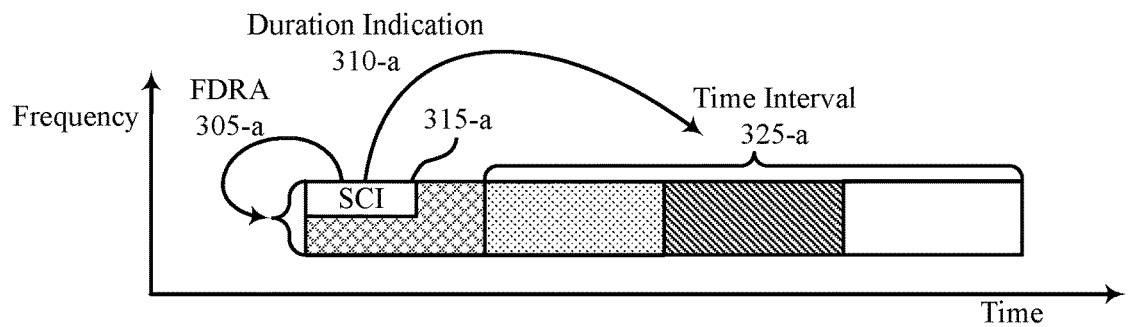
FIG. 3A
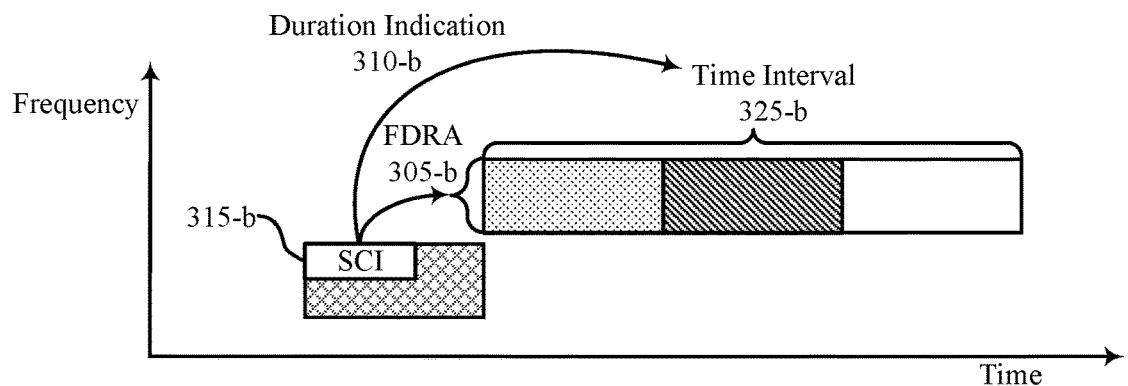
FIG. 3B
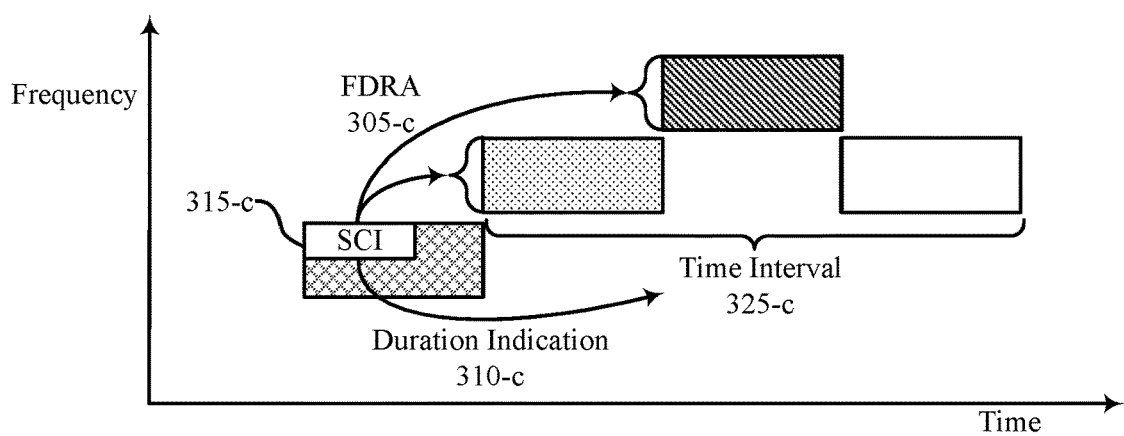
FIG. 3C
 Sidelink Transmission 320-a   Sidelink Transmission 320-c
 Sidelink Transmission 320-b   Sidelink Transmission 320-d

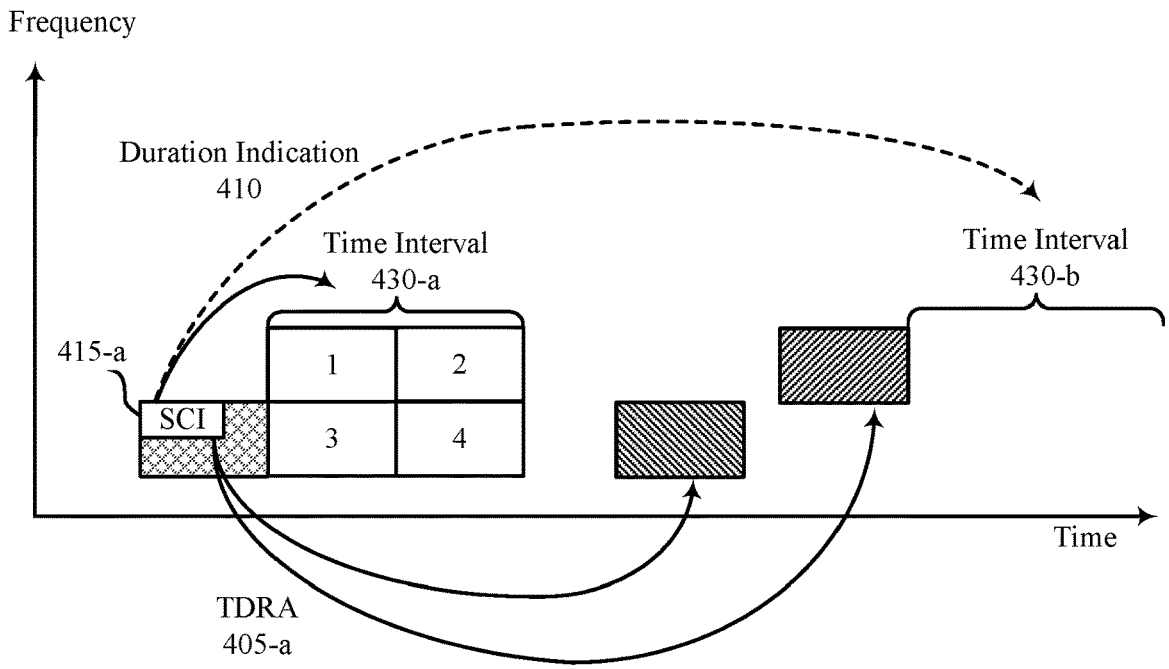
FIG. 4A
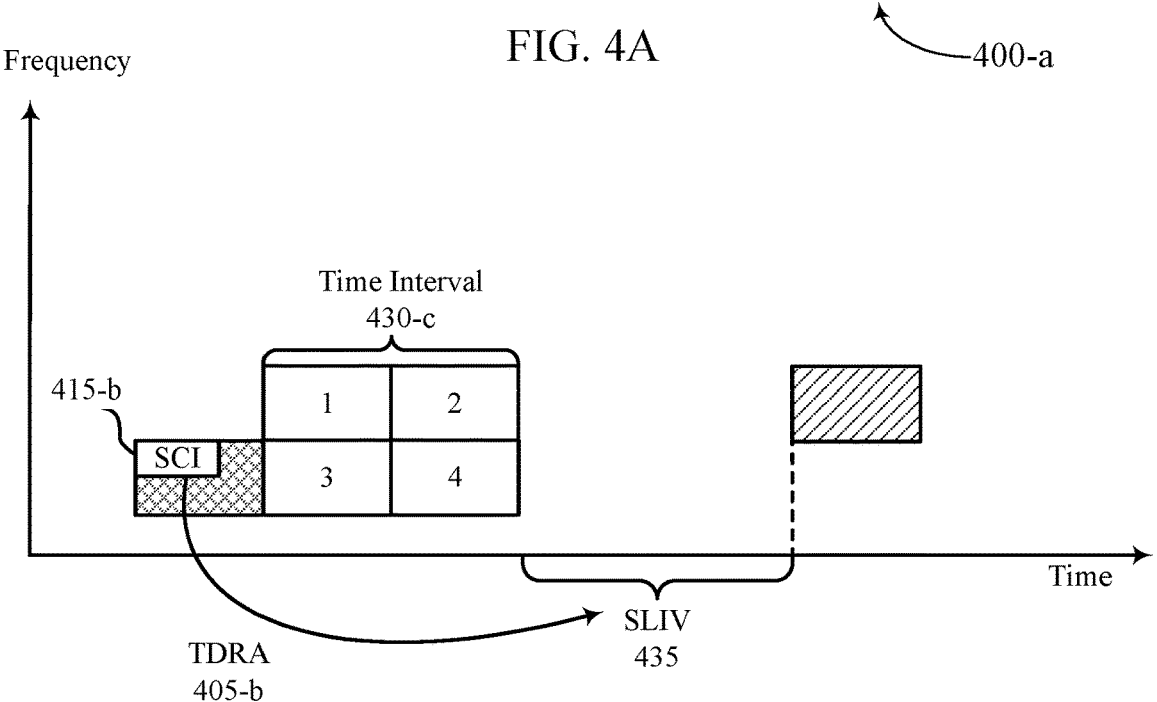
FIG. 4B
 Sidelink Transmission 420-a  Retransmission 425-a
 Retransmission 425-b  Sidelink Transmission 420-b

METHOD AND APPARATUS FOR CONTINUOUS CHANNEL RESERVATION FOR SIDELINK COMMUNICATION

FIELD OF DISCLOSURE

The following relates to wireless communications, including a method and apparatus for continuous channel reservation for sidelink communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support method and apparatus for continuous channel reservation for sidelink communication. The described techniques provide for a user equipment (UE) capable of sidelink communications (e.g., UE-to-UE communication) to configure another UE with a time interval indication for one or more sidelink transmissions in control information for an initial transmission. For example, a UE may obtain a channel occupancy time (COT) in an unlicensed frequency spectrum band. The COT may include an initial time interval for an initial transmission and a subsequent time interval for a subsequent transmission. In the initial time interval, the UE may transmit control information and data to another UE, where the control information indicates the subsequent time interval. The other UE may selectively perform communications during the subsequent time interval (e.g., may refrain from transmitting or receiving if resources over the subsequent time interval are occupied). The UE may perform the subsequent transmission during the subsequent time interval.

A method for wireless communication at a first UE is described. The method may include obtaining a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval, transmitting, during at least the portion of the first time interval and to a second UE, the first control information and the first data over a sidelink shared channel, the first control information indicating the second time interval, and transmitting, during at least the portion of the second time interval, the second control information and the second data over the sidelink shared channel.

An apparatus for wireless communication at a first UE is described. The apparatus may include a processor, memory coupled with the processor, and instructions stored in the memory. The instructions may be executable by the processor to cause the apparatus to obtain a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval, transmit, during at least the portion of the first time interval and to a second UE, the first control information and the first data over a sidelink shared channel, the first control information indicating the second time interval, and transmit, during at least the portion of the second time interval, the second control information and the second data over the sidelink shared channel.

Another apparatus for wireless communication at a first UE is described. The apparatus may include means for obtaining a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval, means for transmitting, during at least the portion of the first time interval and to a second UE, the first control information and the first data over a sidelink shared channel, the first control information indicating the second time interval, and means for transmitting, during at least the portion of the second time interval, the second control information and the second data over the sidelink shared channel.

A non-transitory computer-readable medium storing code for wireless communication at a first UE is described. The code may include instructions executable by a processor to obtain a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval, transmit, during at least the portion of the first time interval and to a second UE, the first control information and the first data over a sidelink shared channel, the first control information indicating the second time interval, and transmit, during at least the portion of the second time interval, the second control information and the second data over the sidelink shared channel.

Some examples of the method, apparatuses, and non-transitory computer-readable medium described herein may further include operations, features, means, or instructions for transmitting sidelink control information (SCI) to configure the second UE with a list of subchannels associated with the sidelink shared channel, each subchannel in the list of subchannels being within the second time interval, where the first control information includes the SCI.

Some examples of the method, apparatuses, and non-transitory computer-readable medium described herein may further include operations, features, means, or instructions for selecting one or more subchannels associated with a same frequency domain resource allocation (FDRA) as the sidelink shared channel, within a listen-before-talk subband occupied by the sidelink shared channel, or both and transmitting the list of subchannels based on selecting the one or more subchannels, where the list of subchannels includes the one or more subchannels.

Some examples of the method, apparatuses, and non-transitory computer-readable medium described herein may further include operations, features, means, or instructions for transmitting the SCI based on a relationship between the first UE and the second UE, where the relationship corresponds to the first UE and the second UE being within a same zone, the first UE and the second UE being within a same UE group, or both.

Some examples of the method, apparatuses, and non-transitory computer-readable medium described herein may further include operations, features, means, or instructions for establishing the relationship via sidelink radio resource control (RRC) signaling, according to a resource pool, or both.

In some examples of the method, apparatuses, and non-transitory computer-readable medium described herein, the SCI includes stage-one SCI or stage-two SCI.

Some examples of the method, apparatuses, and non-transitory computer-readable medium described herein may further include operations, features, means, or instructions for transmitting the first control information indicating the second time interval based on a resource pool of the first UE, the second UE, or both, where the first control information includes a FDRA field.

In some examples of the method, apparatuses, and non-transitory computer-readable medium described herein, the FDRA field indicates a set of multiple frequency domain resources associated with a set of multiple subchannels used to transmit the first data over the sidelink shared channel and the method, apparatuses, and non-transitory computer-readable medium may include further operations, features, means, or instructions for transmitting the second data over the set of multiple subchannels using the set of multiple frequency domain resources.

In some examples of the method, apparatuses, and non-transitory computer-readable medium described herein, the FDRA field indicates a set of multiple frequency domain resources for the second data and the method, apparatuses, and non-transitory computer-readable medium may include further operations, features, means, or instructions for transmitting the second data using the set of multiple frequency domain resources.

Some examples of the method, apparatuses, and non-transitory computer-readable medium described herein may further include operations, features, means, or instructions for transmitting the first control information including an indicator corresponding to a use of the second time interval or one or more time domain resource allocations (TDRAs), where a number of bits of the indicator corresponds to a number of TDRAs of the one or more TDRAs.

Some examples of the method, apparatuses, and non-transitory computer-readable medium described herein may further include operations, features, means, or instructions for transmitting SCI indicating the second time interval for transmission of the second control information and the second data and a TDRA indication for a retransmission of the first control information and the first data, where the first control information includes the SCI and the TDRA indication.

Some examples of the method, apparatuses, and non-transitory computer-readable medium described herein may further include operations, features, means, or instructions for transmitting the retransmission according to the TDRA indication prior to the second control information and the second data.

Some examples of the method, apparatuses, and non-transitory computer-readable medium described herein may further include operations, features, means, or instructions for transmitting a TDRA indicating the second time interval and a third time interval for a retransmission of the first control information and the first data, where the first control information includes the TDRA.

Some examples of the method, apparatuses, and non-transitory computer-readable medium described herein may further include operations, features, means, or instructions for receiving signaling configuring a resource pool for the first UE and the second UE, where the TDRA corresponds to the resource pool.

Some examples of the method, apparatuses, and non-transitory computer-readable medium described herein may further include operations, features, means, or instructions for determining to perform COT sharing with the second UE based on the second time interval, a COT length, a channel access priority class, or any combination thereof and transmitting, to the second UE, an indication of the COT sharing, where the first control information includes the indication.

Some examples of the method, apparatuses, and non-transitory computer-readable medium described herein may further include operations, features, means, or instructions for transmitting first SCI including the second time interval and transmitting second SCI including the indication.

Some examples of the method, apparatuses, and non-transitory computer-readable medium described herein may further include operations, features, means, or instructions for transmitting SCI including the second time interval and the indication.

In some examples of the method, apparatuses, and non-transitory computer-readable medium described herein, determining to perform COT sharing may include operations, features, means, or instructions for determining the first UE and the second UE may be within a same zone, share a unicast connection, or both.

In some examples of the method, apparatuses, and non-transitory computer-readable medium described herein, the first control information indicates a third time interval associated with third control information and third data and the method, apparatuses, and non-transitory computer-readable medium may include further operations, features, means, or instructions for transmitting, during at least a portion of the third time interval and subsequent to the second time interval, the third control information and the third data over the sidelink shared channel, where the second control information indicates the third time interval.

In some examples of the method, apparatuses, and non-transitory computer-readable medium described herein, obtaining the COT may include operations, features, means, or instructions for performing a channel access procedure to obtain the COT, where the channel access procedure includes a listen before talk (LBT) procedure.

Some examples of the method, apparatuses, and non-transitory computer-readable medium described herein may further include operations, features, means, or instructions for determining a time delay between an end of the first time interval and a beginning of the second time interval exceeds a threshold amount of time and applying a cyclic prefix extension to the second control information based on the time delay exceeding the threshold amount of time.

Some examples of the method, apparatuses, and non-transitory computer-readable medium described herein may further include operations, features, means, or instructions for transmitting the second control information to the second UE or to another UE.

In some examples of the method, apparatuses, and non-transitory computer-readable medium described herein, the second data includes a retransmission of the first data.

In some examples of the method, apparatuses, and non-transitory computer-readable medium described herein, the second data may be different from the first data.

A method for wireless communication at a first UE is described. The method may include receiving, during at least a portion of a first time interval and from a second UE, first control information and first data over a sidelink shared channel during a COT in an unlicensed frequency spectrum band, the first control information indicating a second time interval subsequent to the first time interval and selectively performing communications during at least a portion of the second time interval based on receiving the first control information.

An apparatus for wireless communication at a first UE is described. The apparatus may include a processor, memory coupled with the processor, and instructions stored in the memory. The instructions may be executable by the processor to cause the apparatus to receive, during at least a portion of a first time interval and from a second UE, first control information and first data over a sidelink shared channel during a COT in an unlicensed frequency spectrum band, the first control information indicating a second time interval subsequent to the first time interval and selectively perform communications during at least a portion of the second time interval based on receiving the first control information.

Another apparatus for wireless communication at a first UE is described. The apparatus may include means for receiving, during at least a portion of a first time interval and from a second UE, first control information and first data over a sidelink shared channel during a COT in an unlicensed frequency spectrum band, the first control information indicating a second time interval subsequent to the first time interval and means for selectively performing communications during at least a portion of the second time interval based on receiving the first control information.

A non-transitory computer-readable medium storing code for wireless communication at a first UE is described. The code may include instructions executable by a processor to receive, during at least a portion of a first time interval and from a second UE, first control information and first data over a sidelink shared channel during a COT in an unlicensed frequency spectrum band, the first control information indicating a second time interval subsequent to the first time interval and selectively perform communications during at least a portion of the second time interval based on receiving the first control information.

Some examples of the method, apparatuses, and non-transitory computer-readable medium described herein may further include operations, features, means, or instructions for receiving SCI to configure the first UE with a list of subchannels associated with the sidelink shared channel, each subchannel in the list of subchannels being within the second time interval, where the first control information includes the SCI and identifying one or more subchannels in the list of subchannels as unavailable for the communications based on receiving the SCI.

Some examples of the method, apparatuses, and non-transitory computer-readable medium described herein may further include operations, features, means, or instructions for receiving the SCI based on a relationship between the first UE and the second UE, where the relationship corresponds to the first UE and the second UE being within a same zone, the first UE and the second UE being within a same UE group, or both.

Some examples of the method, apparatuses, and non-transitory computer-readable medium described herein may further include operations, features, means, or instructions for establishing the relationship via sidelink RRC signaling, according to a resource pool, or both.

In some examples of the method, apparatuses, and non-transitory computer-readable medium described herein, the SCI includes stage-one SCI or stage-two SCI.

Some examples of the method, apparatuses, and non-transitory computer-readable medium described herein may further include operations, features, means, or instructions for receiving the first control information indicating the second time interval based on a resource pool of the first UE, the second UE, or both, where the first control information includes a FDRA field.

Some examples of the method, apparatuses, and non-transitory computer-readable medium described herein may further include operations, features, means, or instructions for receiving the first control information including an indicator corresponding to a use of the second time interval or one or more TDRAs, where a number of bits of the indicator corresponds to a number of TDRAs of the one or more TDRAs.

Some examples of the method, apparatuses, and non-transitory computer-readable medium described herein may further include operations, features, means, or instructions for receiving SCI indicating the second time interval and a TDRA indication for a retransmission of the first control information and the first data, where the first control information includes the SCI and the TDRA indication and determining to perform the communications based on receiving the SCI, where the communications include receiving the retransmission of the first control information and the first data according to the TDRA indication.

Some examples of the method, apparatuses, and non-transitory computer-readable medium described herein may further include operations, features, means, or instructions for receiving a TDRA indicating the second time interval and a third time interval for a retransmission of the first control information and the first data, where the first control information includes the TDRA and determining to perform the communications based on receiving the TDRA, where the communications include receiving, during the third time interval, the retransmission of the first control information and the first data according to the TDRA.

Some examples of the method, apparatuses, and non-transitory computer-readable medium described herein may further include operations, features, means, or instructions for receiving, from the first UE, an indication of COT sharing including the second time interval, a COT length, a channel access priority class, or any combination thereof, where the first control information includes the indication and determining to perform the communications during the COT based on receiving the indication, where the communications include receiving signaling, transmitting signaling, or both in accordance with the COT sharing.

Some examples of the method, apparatuses, and non-transitory computer-readable medium described herein may further include operations, features, means, or instructions for receiving first SCI including the second time interval and receiving second SCI including the indication.

Some examples of the method, apparatuses, and non-transitory computer-readable medium described herein may further include operations, features, means, or instructions for receiving SCI including the second time interval and the indication.

Some examples of the method, apparatuses, and non-transitory computer-readable medium described herein may further include operations, features, means, or instructions for receiving, for the second time interval, second control information and second data over the sidelink shared channel.

BRIEF DESCRIPTION OF THE DRAWINGS

FIGS. 3A, 3B, 3C, 4A, and 4B illustrate examples of resource diagrams that support continuous channel reservation for sidelink communication in accordance with various aspects of the present disclosure.

DETAILED DESCRIPTION

In some wireless communications systems, such as vehicle-to-everything (V2X) systems, a wireless device may transmit control information and data to another wireless device in a sidelink shared channel. To reduce or mitigate resource collision, a base station may facilitate centralized coordination of time-frequency resource reservation for scheduling transmissions. The reservation information may be carried between wireless devices in sidelink control information (SCI) in a time domain resource allocation (TDRA) field and a frequency domain resource allocation (FDRA) field. The SCI may include resource reservation for one or two scheduled transmissions. However, a wireless device may transmit continuous control information and data transmissions during a channel occupancy time (COT), which may cause resource collision due to lack of scheduling.

As described herein, a wireless device, such as a user equipment (UE), may continuously transmit for a duration, or one or more time intervals, to other wireless devices to prevent resource collision for the continuous transmissions. For example, the UE obtains a COT in an unlicensed frequency spectrum band by performing a listen-before-talk (LBT) procedure. The UE transmits control information and data to another UE during a slot (e.g., duration or time interval) of the COT. The control information includes an indication of a time interval for one or more continuous transmissions. If the UE schedules multiple back-to-back transmissions, the control information in the first transmission indicates the time interval of those back-to-back transmissions. The other UE knows that the resources during that time interval are occupied, and refrains from transmitting using the resources. Otherwise, the UE indicates to the other UE to perform COT sharing, such that the other UE continues to transmit and receive signaling. The UE transmits the continuous transmissions during the time interval.

Aspects of the disclosure are initially described in the context of wireless communications systems. Aspects of the disclosure are further described in the context of resource diagrams and process flows. Aspects of the disclosure are further illustrated by and described with reference to apparatus diagrams, system diagrams, and flowcharts that relate to continuous channel reservation for sidelink communication.

Figure 1:
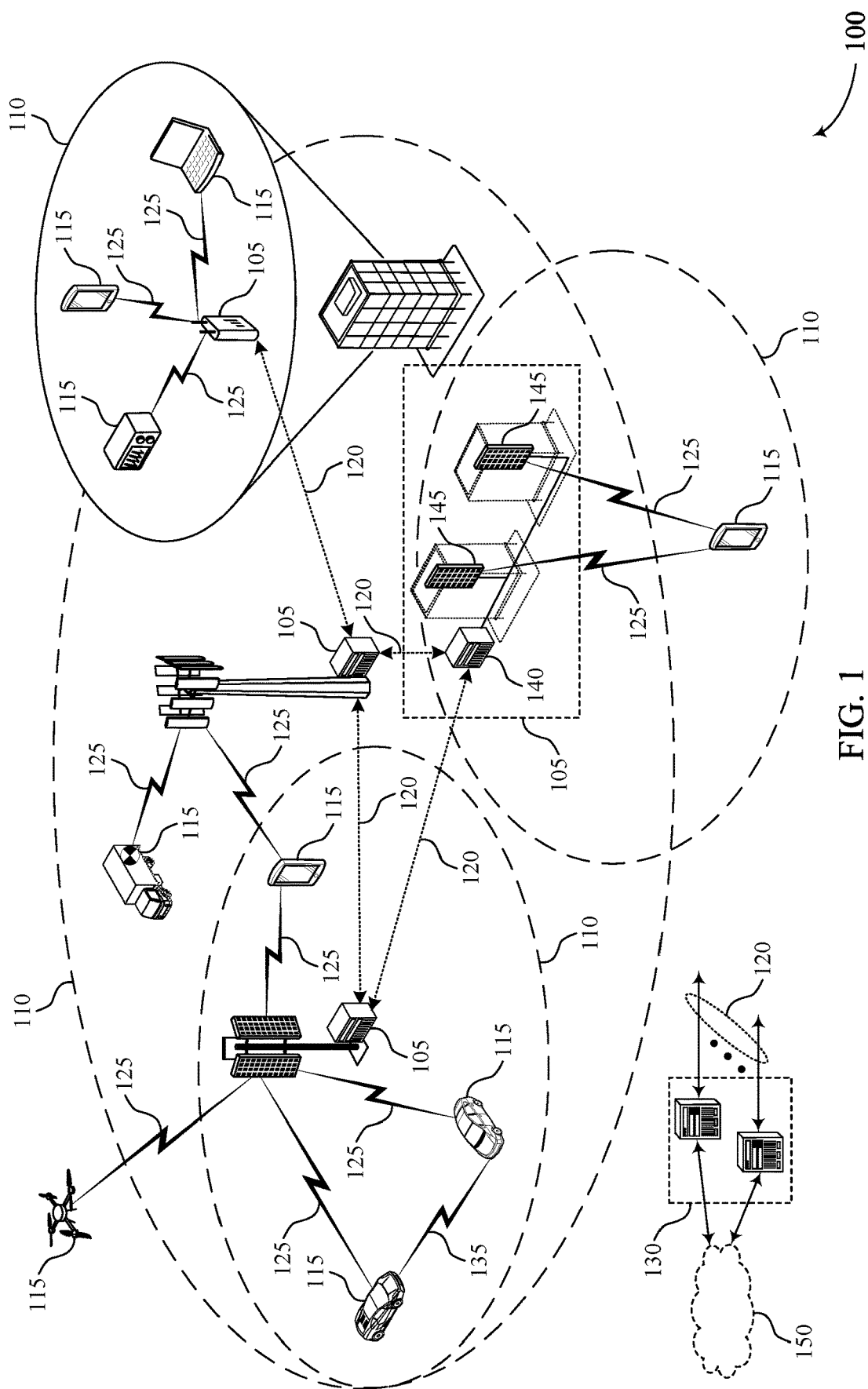
FIGS. 1 and 2 illustrate examples of wireless communications systems that support continuous channel reservation for sidelink communication in accordance with various aspects of the present disclosure.

FIG. 1 illustrates an example of a wireless communications system 100 that supports continuous channel reservation for sidelink communication in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). In some examples, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a wireless device in the wireless communications system 100, such as a UE 115, may continuously transmit for a duration, or one or more time intervals, to other wireless devices to prevent resource collision for the continuous transmissions. For example, the UE 115 may obtain a COT in an unlicensed frequency spectrum band by performing an LBT procedure. The UE 115 may transmit control information and data to another UE 115 during a slot (e.g., duration or time interval) of the COT. The control information may include an indication of a time interval for one or more continuous transmissions. If the UE 115 schedules multiple back-to-back transmissions, the control information in the first transmission indicates the time interval of those back-to-back transmissions. The other UE 115 may know that the resources during that time interval are occupied, and may refrain from transmitting using the resources. Otherwise, the UE 115 may indicate to the other UE 115 to perform COT sharing, such that the other UE 115 may continue to transmit and receive signaling. The UE 115 may transmit the continuous transmissions during the time interval.

Figure 2:
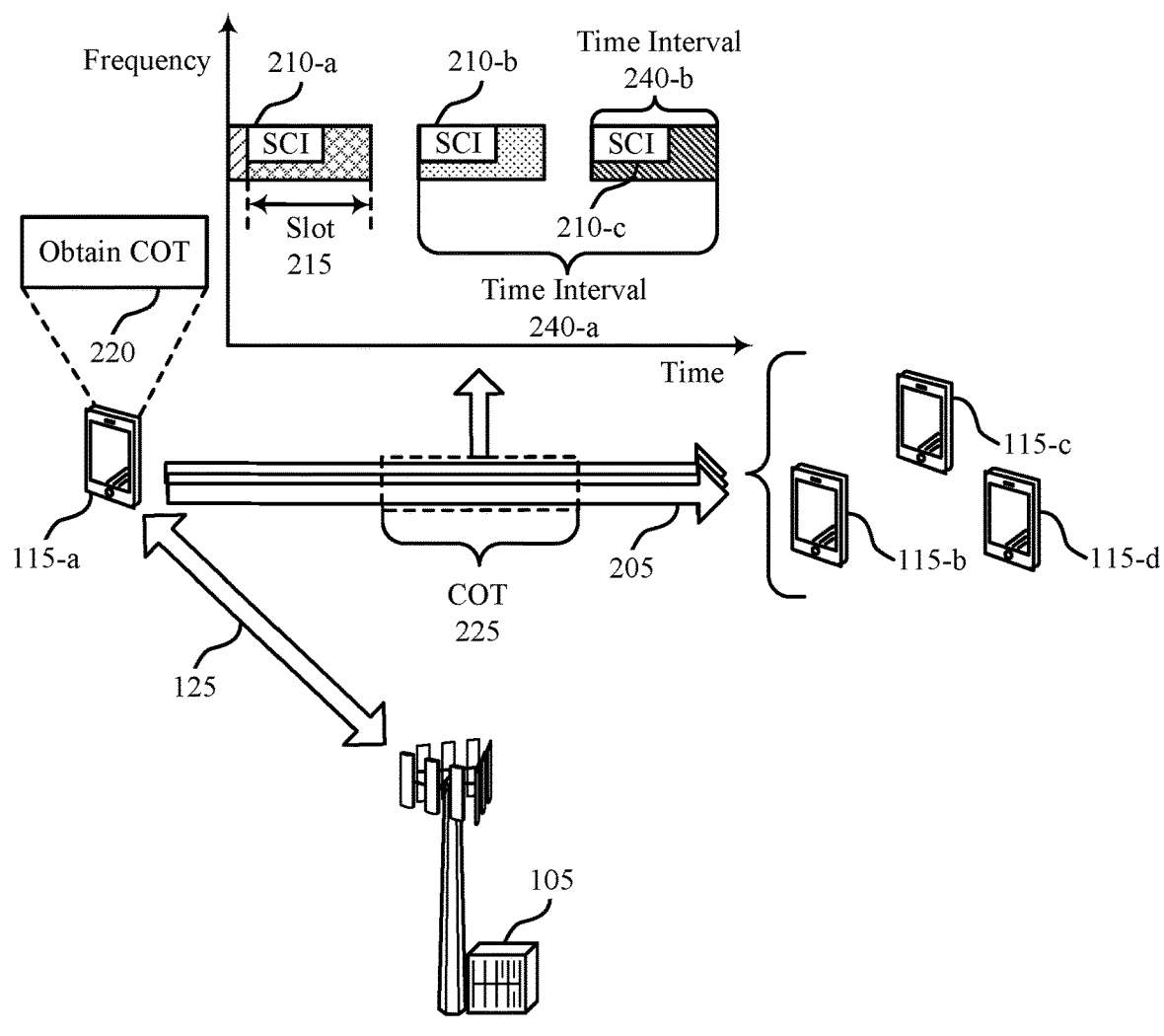

FIG. 2 illustrates an example of a wireless communications system 200 that supports continuous channel reservation for sidelink communication in accordance with various aspects of the present disclosure. In some examples, wireless communications system 200 may implement aspects of wireless communications system 100 and may include a UE 115-a, a UE 115-b, a UE 115-c, a UE 115-d, and a base station 105, which may be examples of UEs 115 and a base station 105 as described with reference to FIG. 1. In some examples, the base station 105 and UEs 115, such as UE 115-a, may communicate control information, data, or both using a communication link 125. Similarly, the UE 115-a may communicate control information, data, or both with another UE 115, or multiple UEs 115, such as UE 115-b, UE 115-c, UE 115-d, or a combination thereof, using one or more sidelink communication links 205. For example, UE 115-a may transmit a time interval for continuous channel reservation to UE 115-b, UE 115-c, UE 115-d, or a combination thereof via one or more sidelink communication links 205.

In some examples, one or more UEs may communicate with each other, which may be referred to as sidelink communications. For example, in a V2X system, UEs 115 may perform sidelink communications to exchange periodic messages between nearby UEs 115, which may be vehicles, over one or more frequency bands (e.g., sub-6 Hz intelligent transport system (ITS) or licensed frequency bands). In some cases, a wireless device (e.g., UE 115 or base station 105) may perform resource allocation according to different communication modes (e.g., mode 1 and mode 2 resource allocation). For example, mode 2 resource allocation may support standalone sidelink deployment (e.g., in the absence of a base station 105 to facilitate centralized control or coordination). A UE 115 may reserve one or more time-frequency resources to mitigate resource collision for distributed channel access.

The UE 115 may include the reservation information in SCI 210, such as stage-one SCI (SCI-1). Specifically, the SCI 210 may include a codepoint of a TDRA as part of the reservation information. When a resource pool supports one time-frequency resource reservation, the TDRA may be a number of bits (e.g., 5-bits) to indicate the index of a slot 215 that may be reserved, the slot 215 being within future slots (e.g., 32 future slots). In some examples, a slot 215 may be a dynamic scheduling unit that refers to a duration for one or more transmissions. Each slot 215 may be divided into multiple symbols. When a resource pool supports two time-frequency resource reservations, the TDRA may be a greater number of bits than if the resource pool supports one time-frequency resource reservation (e.g., 9-bits), to indicate indices of the two future reserved slots. Similarly, the resource pool may support any number of time-frequency resource reservations, and the TDRA may be a corresponding number of bits.

In some examples, sidelink communications between UEs 115 may be supported by DRX for battery-powered UEs 115, inter-UE coordination for improved reliability (e.g., for mode 2 communications), and the like. Further, sidelink communications may be deployed over one or more frequency bands (e.g., sub-6 GHz ITS or licensed frequency bands). Deployment over the one or more frequency bands may include the Frequency Range 1 (FR1) unlicensed spectrum (e.g., sub-6 GHz frequency bands) for both mode 1 and mode 2 communications, where base station 105 to UE 115 communication, which may be referred to as Uu operation, for mode 1 communications may be over a licensed spectrum. Sidelink communication and operation may occur on one or more unlicensed frequency spectrum bands, which may involve channel access and changes to channel structures and procedures. Thus, a UE 115 may perform continuous channel access within a COT to improve channel access overhead. The UE 115 may also co-exist with other radio access technologies (RATs) over one or more unlicensed frequency spectrum bands (e.g., FR1 unlicensed spectrum), which may be imposed with LBT (e.g., by local regulations).

For example, LBT may be imposed by local regulators for co-existence among different RATs over one or more unlicensed frequency spectrum bands (e.g., 5 GHz and 6 GHz unlicensed bands). There may be multiple types of LBT procedures, such as a Type 1 LBT (e.g., Cat 1 LBT) procedure in which a wireless device may not perform sensing, a Type 2 LBT (e.g., Cat 2 LBT) procedure in which the wireless device may have a fixed sensing period, and additional LBT procedures (e.g., Cat 3 and Cat 4 LBT procedures) with variable sensing periods and random back-offs. Specifically, a node, such as a UE 115, may perform an LBT procedure (e.g., a Type 1 LBT procedure), within a threshold random interval (e.g., up to 9 ms), to reserve a COT for continuous transmission (e.g., up to 10 ms). The reserved COT may be shared via COT-sharing with other UEs 115 for transmissions during any remaining time. In some examples, there may be multiple RATs operating within the COT, such as Wi-Fi, LTE-license assisted access (LAA), NR-Unlicensed (NR-U), and the like. Each RAT may be capable of performing continuous transmission within the COT as well as COT sharing. For example, for NR-U, both a base station 105 and a UE 115 may continuously transmit over one or more slots 215, which may be allocated by the base station 105, after passing an LBT procedure (e.g., Type 1 LBT procedure).

In some examples, a base station 105 may include a COT structure indication (COT-SI) in control information to one or more UEs 115. For example, the base station 105 may transmit a COT-SI to UE 115-a via communication link 125 in downlink control information (DCI), such as DCI format 2_0 (e.g., DCI 2_0). The one or more UEs 115, may determine a remaining duration of the COT reserved by the base station based on the COT-SI. Additionally or alternatively, the one or more UEs 115 may determine a COT sharing opportunity (e.g., from the base station 105 to the UEs 115) over one or more symbols, one or more slots 215, or the like which are indicated as uplink. In some examples, a UE 115 may transmit a configured grant-uplink control information (CG-UCI) message to a base station 105 that may include COT sharing information. The base station 105 may determine a duration of the COT reserved by a UE 115 as well as an offset for a COT sharing opportunity (e.g., from the UE 115 to the base station 105). In some examples, there may not be a configuration or signaling for sidelink communication over an unlicensed frequency spectrum band for co-existence with other RATs over the unlicensed spectrum (e.g., 5 GHz or 6 GHz).

In some examples, a UE 115 may use a TDRA including an indication for continuous channel reservation for improved channel access over one or more unlicensed frequency spectrum bands (e.g., FR1 in the unlicensed spectrum). In some cases, a UE 115, such as UE 115-a, may include an indicator of a time interval for continuous transmissions in control information. For example, at 220, UE 115-a may obtain a COT 225 for performing back-to-back transmission. UE 115-a may perform a clear channel assessment (CCA) 230 to obtain the COT 225 for sidelink transmission 235-a, sidelink transmission 235-b, and sidelink transmission 235-c. In some examples, sidelink transmission 235-a through sidelink transmission 235-c may be for a same UE 115, or for different UEs 115. For example, UE 115-a may transmit sidelink transmission 235-a to UE 115-b, sidelink transmission 235-b to UE 115-c, and sidelink transmission 235-c to UE 115-d. In some other examples, UE 115-a may transmit sidelink transmission 235-a and sidelink transmission 235-b to UE 115-b and sidelink transmission 235-c to UE 115-c or UE 115-d. UE 115-a may transmit sidelink transmission 235-a, sidelink transmission 235-b, sidelink transmission 235-c, or a combination thereof to any combination of UE 115-b, UE 115-c, and UE 115-d. An SCI 210-a may schedule a sidelink transmission 235-a, an SCI 210-b may schedule a sidelink transmission 235-b, and an SCI 210-c may schedule a sidelink transmission 235-c.

In some cases, UE 115-a may include the indicator of time interval 240-a in SCI 210-a. Time interval 240-a may indicate the continuous transmission of sidelink transmission 235-b and sidelink transmission 235-c remain. For example, SCI 210-a may indicate to UE 115-b, UE 115-c, or UE 115-d that, after sidelink transmission 235-a, which may be a current transmission, (e.g., a transmission over a physical sidelink shared channel (PSSCH)), there may be two other sidelink transmissions 235, sidelink transmission 235-b and sidelink transmission 235-c, which may be back-to-back. Similarly, UE 115-a may include the indicator of time interval 240-*b* in SCI 210-*b*. Time interval 240-*b* may indicate the continuous transmission of sidelink transmission 235-*c* remains. For example, SCI 210-*b* may indicate to UE 115-*b*, UE 115-*c*, or UE 115-*d*, that, after the current sidelink transmission 235-*b* (e.g., over a PSSCH), there may be another sidelink transmission 235, such as sidelink transmission 235-*c*, which may be back-to-back with sidelink transmission 235-*b* and sidelink transmission 235-*a*.

In some examples, the indication of time interval 240-*a* in SCI 210-*a* and the indication of time interval 240-*b* in SCI 210-*b* may reserve one or more time resources for transmission bursts (e.g., sidelink transmission 235-*b* and sidelink transmission 235-*c*). Additionally or alternatively, UE 115-*a* may over reserve one or more time-frequency resources to control leakage among interlaced channels. For example, UE 115-*a* may reserve an entire LBT sub-band even if UE 115-*a* may use a portion of available channels in the sub-band. In some cases, the indication of time interval 240-*a* and the indication of time interval 240-*b* may be used for COT sharing, to communicate information on a COT length, channel access priority class (CAPC), or the like. A sensing UE 115 (e.g., a UE 115 performing a CCA 230, such as by performing an LBT procedure), may learn about COT sharing opportunities earlier. For example, UE 115-*a* may indicate to UE 115-*b*, UE 115-*c*, UE 115-*d*, or a combination thereof to perform COT sharing, prior to the UEs 115 performing a CCA 230. UE 115-*b*, UE 115-*c*, UE 115-*d*, or a combination thereof may jump in during one of sidelink transmission 235-*a*, sidelink transmission 235-*b*, or sidelink transmission 235-*c* for transmitting according to the COT sharing (e.g., at an appropriate instance and with a right burst length).

In some cases, the SCI 210, such as SCI 210-*a* and SCI 210-*b*, may include a control field for resource reservation. For example, the control field may indicate the duration of a train of control channels and shared channels (e.g., a physical sidelink control channel (PSCCH) and PSSCH pair) transmitted back-to-back in an unlicensed frequency spectrum band according to LBT. Other UEs 115 may perform collision avoidance accordingly. For example, UE 115-*b*, UE 115-*c*, and UE 115-*d* may perform collision avoidance when transmitting and receiving control signaling or data during the COT 225. In some examples, UE 115-*a* may indicate the resources for sidelink transmission 235-*a*, sidelink transmission 235-*b*, and sidelink transmission 235-*c* to UE 115-*b*, UE 115-*c*, UE 115-*d*, or a combination thereof using an FDRA mechanism, which is described in further detail with respect to FIGS. 3A, 3B, and 3C. In some other examples, UE 115-*a* may indicate the resources for sidelink transmission 235-*a*, sidelink transmission 235-*b*, and sidelink transmission 235-*c* to UE 115-*b*, UE 115-*c*, UE 115-*d*, or a combination thereof using an TDRA mechanism, which is described in further detail with respect to FIGS. 4A and 4B.

In some examples, the FDRA may indicate a current sidelink shared channel for an entire transmission burst (e.g., time interval 240-*a* in SCI 210-*a* and time interval 240-*b* in SCI 210-*b*). However, the FDRA may not predictably reserve resources for a retransmission of the current sidelink shared channel (e.g., with a consistent radio frequency footprint). Thus, UE 115-*b*, UE 115-*c*, UE 115-*d*, or a combination thereof may not use spatial reuse based on a measurement of the current sidelink shared channel. Thus, UE 115-*a* my enforce back-off for a defined set of sub-channels within the indication of a time interval 240 without interference measurement and prediction at UE 115-*b*, UE 115-*c*, and UE 115-*d*.

When a UE 115 performs back-to-back sidelink control channel and sidelink shared channel transmissions, the UE 115 may carry an indication of a time interval 240 of the transmission bursts after a current transmission in SCI 210. For example, UE 115-*a* may transmit PSCCH and PSSCH pairs, the PSCCH carrying SCI 210, such as SCI 210-*a* and SCI 210-*b*. The back-to-back transmission may occur after UE 115-*a* obtains a COT, at 220. The COT may be in an unlicensed frequency band imposed with LBT. UE 115-*a* my perform the LBT procedure (e.g., Type 1 LBT), or the LBT procedure outcome may be shared from another UE 115 or from the base station 105 via the communication link 125. In some cases, UE 115-*a* may perform cycle prefix (CP) extension on the first automatic gain control (AGC) symbol of each following sidelink control channel and sidelink shared channel transmission to avoid leaving a gap greater than a threshold (e.g., equal to or greater than 16 micro seconds (μs)) from the proceeding transmission. In some examples, UE 115-*a* may transmit the set of PSCCH and PSSCH pairs to a same destination or to respective destinations (e.g., to one of UE 115-*b*, UE 115-*c*, or UE 115-*d*, or to each of UE 115-*b*, UE 115-*c*, and UE 115-*d*). Each pair may be used for either a new transmission with new data or a retransmission of a previous transmission. Time interval 240-*a* and time interval 240-*b* may be with respect to a number of slots 215. In some examples, UE 115-*a* may select a subcarrier spacing (SCS) for sidelink transmission 235-*a*, sidelink transmission 235-*b*, and sidelink transmission 235-*c* based on the duration of the COT 225. For example, for a 30 kHz and 15 kHz SCS, UE 115-*a* may use a 5-bit or 4-bit indicator for the time intervals 240 for a COT of 10 ms.

In some examples, UE 115-*a* may transmit sidelink transmission 235-*b* and sidelink transmission 235-*c* during time interval 240-*a*. UE 115-*a* may transmit sidelink transmission 240-*c* during time interval 240-*b*. UE 115-*b*, UE 115-*c*, and UE 115-*d* may selectively perform transmissions during time interval 240-*a* and time interval 240-*b* based on a COT sharing status, one or more available sub-channels, or the like.

FIGS. 3A, 3B, and 3C illustrate examples of a resource diagrams 300 that supports continuous channel reservation for sidelink communication in accordance with various aspects of the present disclosure. In some examples, resource diagram 300-*a*, resource diagram 300-*b*, and resource diagram 300-*c*, may implement aspects of wireless communications system 100 and wireless communications system 200. For example, as illustrated in resource diagram 300-*a*, a UE, which may be an example of a UE 115 as described in FIGS. 1 and 2, may transmit control information including an FDRA 305-*a* that indicates frequency resources for a current transmission and a duration indication 310-*a* to another UE. In some other examples, as illustrated in resource diagram 300-*b* and resource diagram 300-*c*, a UE may transmit control information including an FDRA 305-*b* and FDRA 305-*c*, respectively, that indicates frequency resources for one or more subsequent transmissions and a duration indication 310-*b* and 310-*c* to another UE.

In some examples, a UE may transmit control information, such as SCI 315 to another UE. The SCI 315 may be SCI-1. The UE may include the SCI 315 in a sidelink control channel, and the SCI 315 may schedule a sidelink shared channel. The sidelink control channel and sidelink shared channel pair may be referred to as a sidelink transmission 320. The SCI 315 may include an FDRA 305 indicating one or more frequency resources and a duration indication 310 indicating one or more time resources for communication, which may replace a TDRA. The duration indication 310 may be configured according to a resource pool. For example, a network entity (e.g., a base station) may configure a UE by resource pool to carry an indication (e.g., a one bit indication) in the SCI 315 to dynamically switch between using the duration indication 310 and a TDRA to indicate the time resources.

In some cases, as illustrated in resource diagram 300-a, SCI 315-a may indicate FDRA 305-a and duration indication 310-a. The duration indication 310-a may indicate time interval 325-a, which may be a duration of back-to-back transmissions including sidelink transmission 320-b, sidelink transmission 320-c, sidelink transmission 320-d, or a combination thereof. FDRA 305-a may indicate a number of sub-channels used by a current sidelink shared channel for sidelink transmission 320-a. The following sidelink transmissions 320, including sidelink transmission 320-b, sidelink transmission 320-c, sidelink transmission 320-d, or a combination thereof may use same frequency domain resources as the current sidelink transmission 320-a.

In some other cases, as illustrated in resource diagram 300-b, SCI 315-b may indicate FDRA 305-b and duration indication 310-b. The duration indication 310-b may indicate time interval 325-b, which may be a duration of back-to-back transmissions including sidelink transmission 320-b, sidelink transmission 320-c, sidelink transmission 320-d, or a combination thereof. FDRA 305-b may indicate one or more frequency resources used by following bursts of sidelink transmissions 320, including sidelink transmission 320-b, sidelink transmission 320-c, sidelink transmission 320-d, or a combination thereof. That is, each subsequent sidelink transmission 320 to sidelink transmission 320-a may use a same number of sub-channels as a current sidelink shared channel for sidelink transmission 320-a, but at different frequency domain locations as indicated by the FDRA codepoint.

Similarly, as illustrated in resource diagram 300-c, SCI 315-c may indicate FDRA 305-c and duration indication 310-c. The duration indication 310-c may indicate time interval 325-c, which may be a duration of back-to-back transmissions including sidelink transmission 320-b, sidelink transmission 320-c, sidelink transmission 320-d, or a combination thereof. FDRA 305-c may indicate one or more frequency resources used by following bursts of sidelink transmissions 320, including sidelink transmission 320-b, sidelink transmission 320-c, sidelink transmission 320-d, or a combination thereof. The UE may include an explicit indication of an FDRA 305, such as FDRA 305-c, to indicate different frequency resources for subsequent sidelink transmissions (e.g., instead of that of a current sidelink shared channel). For example, FDRA 305-c may indicate different frequency resources for sidelink transmission 320-b, sidelink transmission 320-c, and sidelink transmission 320-d.

FIGS. 4A and 4B illustrate examples of resource diagrams 400 that support continuous channel reservation for sidelink communication in accordance with various aspects of the present disclosure. In some examples, resource diagram 400-a and resource diagram 400-b may implement aspects of wireless communications system 100 and wireless communications system 200. For example, as illustrated in resource diagram 400-a, a UE, which may be an example of a UE 115 as described in FIGS. 1 and 2, may transmit control information including a TDRA 405-a that indicates time resources for a retransmission of a current transmission and a duration indication 410 to another UE. In some other examples, as illustrated in resource diagram 400-b, a UE may transmit control information including a TDRA 405-b that indicates both a duration of continuous reservation and non-continuous reservations.

In some examples, a UE may transmit control information, such as SCI 415 to another UE. The SCI 415 may be SCI-1. The UE may include the SCI 415 in a sidelink control channel, and the SCI 415 may schedule a sidelink shared channel. The sidelink control channel and sidelink shared channel pair may be referred to as a sidelink transmission 420. The SCI 415 may include a TDRA 405, a duration indication 410, or both indicating one or more time resources for communication. Together with an FDRA, as described with respect to FIGS. 3A through 3C, one or more UEs may perform collision avoidance. Specifically, after decoding a duration indication 410, such as in SCI 415-a, a receiving UE (e.g., sensing UE) may be configured to mark a set of subchannels within the indicated duration (e.g., sub-channel 1, 2, 3, and 4) as unavailable. In some examples, a UE transmitting SCI 415-a may define the set of sub-channels as any sub-channel having a same FDRA as a sidelink shared channel carrying SCI 415-a or a number of sub-channels within one or more LBT sub-bands occupied by the sidelink shared channel carrying SCI 415-a (e.g., where the number is all of the sub-channels). In some other examples, the UE may indicate one of the two options or may provide for a receiving UE to choose between the two options in SCI 415-a.

In some cases, if the UE defines the set of sub-channels as any sub-channel having a same FDRA, one or more sub-channels may be left empty. One or more other UEs may use the frequency domain resources not occupied by one or more sidelink transmissions 420. For example, if the other UEs are configured to perform COT sharing, the UEs may use the resources. UE-to-UE sharing may occur according to a defined procedure. To use the FDM resource, other UEs may use an LBT procedure (e.g., Cat 2 LBT) if COT sharing to another sidelink transmission is supported. Additionally or alternatively, the UEs may use a Cat 4 LBT procedure, in which the other UE may acquire a COT, while the UE backs-off from the resources. For both Cat 2 and Cat 4 LBT, if the other UE is too close to the transmitting UE, the LBT may fail due to the energy transmitted from the transmitting UE, which may prevent or reduce FDM resource reuse when UEs are too close.

In some other examples, instead of using a duration indication 410 and FDRA to perform collision avoidance, the collision avoidance behavior at a receiving or sensing UE may be configured to be UE-dependent (e.g., according to resource pool). Specifically, a sensing UE may be configured to perform collision avoidance when there is a defined relationship between the sensing UE and a source or destination UE in SCI 415-a. For example, the sensing UE may execute a back-off if the sensing UE is located within a same zone of a source UE, a same zone of a destination UE, or both. Additionally or alternatively, the sensing UE may execute a back-off if the sensing UE is within a group (e.g., layer 2 (L2) group) including a source UE, a destination UE, or both. Instead of being configured according to a resource pool, the UE-dependent reservation may be agreed between a pair of unicast UEs via sidelink control signaling, such as sidelink RRC (PC5-RRC) signaling. The sidelink control signaling may be semi-static or dynamic via an indication in SCI 415 (e.g., a layer 1 (L1) indication in SCI type 2 (SCI-2)). In some cases, SCI 415-a may be SCI-2.

In some cases, as illustrated in resource diagram 400-a, SCI 415-a may indicate TDRA 405-a and duration indication 410 in parallel to reserve both a burst for one or more additional sidelink transmissions 420 and one or more (e.g., up to 2) non-continuous transmission slots for a retransmission 425 of a current sidelink transmission 420-a on a sidelink shared channel. In some cases, the duration indication 410 may indicate time interval 430-a, time interval 430-b, or both, which may be durations of back-to-back transmissions including one or more sidelink transmission 420. The duration indication 410 may be configured to apply after the slots reserved for retransmission 425-a and retransmission 425-b (e.g., to indicate reservation of transmission bursts in the future).

In some other cases, as illustrated in resource diagram 400-b, SCI 415-b may indicate TDRA 405-b, which may include a new type of indication for both a duration of a continuous reservation and a non-continuous reservation. For example, a UE may use a start and length indicator (SLIV) 435 for a time domain allocation. The UE may encode TDRA 405-b according to the SLIV 435 for one or more reservations (e.g., two, where sl-MAxNumPerReserve=3). The UE may use a same encoding approach to indicate a burst duration, such as time interval 430-c, and an isolated reservation for sidelink transmission 420-b, which may include a new transmission. Similarly, same FDRA entries in an FDRA codepoint may indicate a non-continuous reservation, while different FDRA entries may indicate a continuous reservation. In some examples, TDRA 405-b may be configured according to a resource pool. In some cases, a UE may configure two candidate time domain resource allocations in L2 and may introduce a one bit parameter in SCI 415-b to switch between the two candidates. In some other cases, a UE may configure three candidate time domain resource allocations in L3 and may introduce a two bit parameter in SCI 415-b to switch among them.

In some cases, a UE may use a duration indication 410 together with COT information (e.g., COT length and CAPC) to indicate COT sharing opportunities to other UEs. For example, the UE may encode the duration indication 410 and the COT information separately, with the duration indication in SCI-1 and COT information in SCI-2. In some other examples, the UE may encode the duration indication 410 and the COT information jointly, in SCI-1 or SCI-2. The UE may perform the joint encoding of the duration indication 410, the COT information, and CAPC according to an encoding scheme. In some cases, the UE may use a number of bits to achieve a granularity (e.g., 11 bits to arrive at a granularity of 0.25 ms). The UE may use a reduced number of bits according to one or more SCSs (e.g., 15 kHz and 30 kHz).

In some examples, UE-to-UE COT sharing may be defined such that a UE may share a COT with another UE when they are in a same zone or a defined set of zones. The UEs may share a COT when they have a unicast connection. A control field or codepoint of a remaining COT and CAPC may be encoded as an index according to a configured set or list of valid combinations of remaining COT and CAPC values (e.g., for 18 or 19 remaining COT slots, use 3 or 4 for CAPC, and for 5 or 6 remaining COT slots, use 2, 3, or 4 for CAPC).

In some examples, for mode 1 communications, a wireless device may include a TDRA in a DCI message, such as a DCI format 3 (DCI 3_0) message. Similarly, the duration indication 410 together with an FDRA may be used in an enhance DCI 3_0 message for a scheduling grant of sidelink resources.

Figure 5:
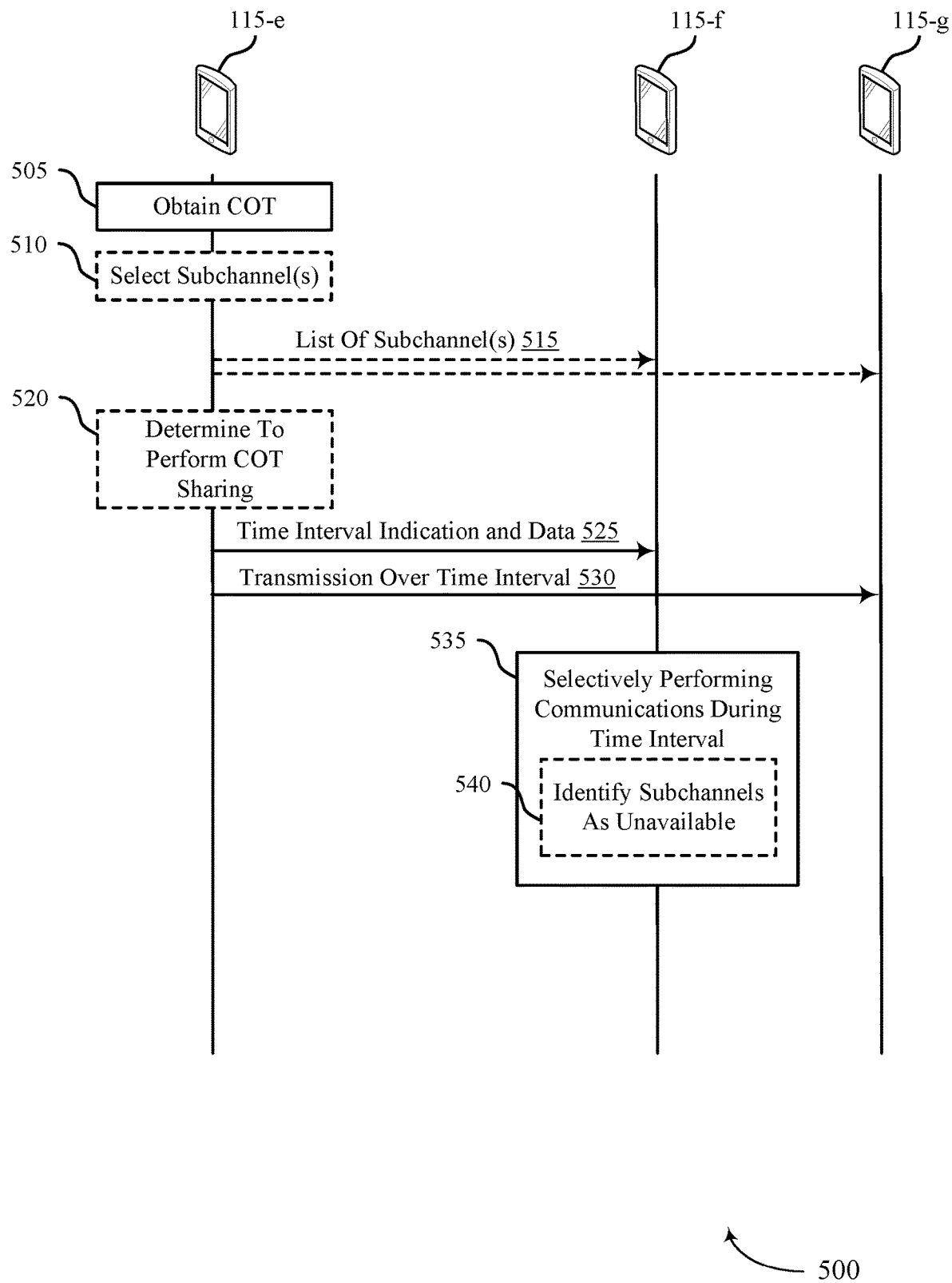
FIG. 5 illustrates an example of a process flow that supports continuous channel reservation for sidelink communication in accordance with various aspects of the present disclosure.

FIG. 5 illustrates an example of a process flow 500 that supports continuous channel reservation for sidelink communication in accordance with various aspects of the present disclosure. In some examples, the process flow 500 may implement aspects of wireless communications system 100, wireless communications system 200, and resource diagrams 300-a through 400-b. The process flow 500 may illustrate an example of a UE 115-e indicating a time interval to UE 115-f, UE 115-g, or both for one or more sidelink transmission during a COT in an unlicensed frequency spectrum band. UE 115-e through UE 115-g may be examples of UEs 115 as described with reference to FIGS. 1 and 2. Alternative examples of the following may be implemented, where some processes are performed in a different order than described or are not performed. In some cases, processes may include additional features not mentioned below, or further processes may be added.

At 505, UE 115-e may obtain a COT in an unlicensed frequency spectrum band. The COT may be for transmitting one or more pairs of sidelink control conformation and data over a sidelink shared channel. For example, UE 115-e may obtain the COT to transmit an initial pair of sidelink control information and data during at least a portion of an initial time interval and one or more additional pairs of sidelink control information and data during at least a portion of subsequent time intervals. UE 115-e may perform a channel access procedure to obtain the COT, such as an LBT procedure.

At 510, UE 115-e may select one or more sub-channels associated with a same FDRA as the sidelink shared channel, within an LBT subband occupied by the sidelink shared channel, or both.

At 515, UE 115-e may transmit the list of selected sub-channels to UE 115-f, UE 115-g, or both.

At 520, UE 115-e may determine to perform COT sharing with UE 115-f, UE 115-g, or both based on the subsequent time intervals, a COT length, a CAPC, or any combination thereof. For example, UE 115-e may determine to perform COT sharing based on UE 115-e and UE 115-f, or UE 115-g being within a same zone, sharing a unicast connection, or both.

At 525, UE 115-e may transmit control information and data over the sidelink shared channel. The control information may indicate one or more subsequent time intervals for additional transmissions over the sidelink shared channel. UE 115-e may include the time interval indication in a sidelink control channel and sidelink shared channel pair (e.g., a PSCCH and PSSCH pair). In some examples, the control information may include SCI, such as SCI-1, SCI-2, or both. The SCI may configure UE 115-f, UE 115-g, or both with the list of sub-channels of the sidelink shared channel. Each sub-channel in the list may be within the subsequent time interval in the time interval indication.

In some cases, UE 115-e may transmit the SCI based on a relationship between UE 115-e and UE 115-f or UE 115-g. The relationship may be based on the UEs 115 being within a same zone or set of zones, within a same group, or both. UE 115-e may establish the relationship via sidelink RRC signaling (e.g., PC5-RRC signaling), according to a resource pool, or both.

In some examples, UE 115-e may transmit the time interval indication based on a resource pool of UE 115-e, UE 115-f, UE 115-g, or a combination thereof. The control information may include an FDRA field. In some cases, the FDRA field may indicate multiple frequency domain resources, which may be for sub-channels used to transmit data over the sidelink shared channel in a sidelink transmission paired with the control information.

In some examples, the control information may include an indicator for a use of the subsequent time interval or one or more TDRAs, where a number of bits of the indicator is based on a number of TDRAs. In some cases, UE 115-e may transmit SCI indicating the subsequent time interval for the additional transmission and a TDRA for a retransmission of a current transmission. UE 115-e may transmit the retransmission according to the TDRA indication prior to the additional transmission.

In some cases, UE 115-e may transmit a time interval indication for each sidelink transmission (e.g., sidelink control information and data pair), until a continuous transmission ends. One or more of the time intervals may be for a retransmission of early data. UE 115-e may include a TDRA in the control information including a TDRA indicating both a time interval for a new transmission and a time interval for a retransmission. The TDRA may be based on a resource pool configured at UE 115-e. For example, a base station may configure UE 115-e with a resource pool, and UE 115-e may send the TDRA based on the resource pool.

In some examples, the control information may include an indication for UE 115-f, UE 115-g, or both to perform COT sharing. In some cases, UE 115-e may indicate the COT sharing in the initial control information or in subsequent control information and in SCI.

At 530, UE 115-e may transmit at least one additional transmission to UE 115-f, UE 115-g, or both during at least a portion of an indicated time interval. The additional transmission may be a sidelink control channel and sidelink shared channel pair including control information and data. In some cases, UE 115-e may transmit the data for the additional transmission using the sub-channels, the frequency domain resources, or both indicated in the FDRA in the control signaling at 525.

In some examples, UE 115-e may determine a time delay between an end of an initial time interval and a beginning of a subsequent time interval exceeds a threshold amount of time. UE 115-e may apply a cyclic prefix extension to the additional control information based on the time delay exceeding the threshold amount of time.

In some examples, UE 115-e may transmit the additional control information to UE 115-f, UE 115-g, or both. In some cases, the additional data may include a retransmission of previous data. In some other cases, the additional data may include different data than previous data (e.g., new data).

At 535, UE 115-f may selectively perform communications during at least a portion of the subsequent time interval based on receiving the initial control information. For example, at 540, UE 115-f may identify one or more sub-channels are unavailable for communications, and may refrain from communicating using the subchannels. In some other examples, UE 115-f may determine to perform the communications based on receiving SCI at 525, the SCI including a TDRA, a COT sharing status, or the like.

Figure 6:
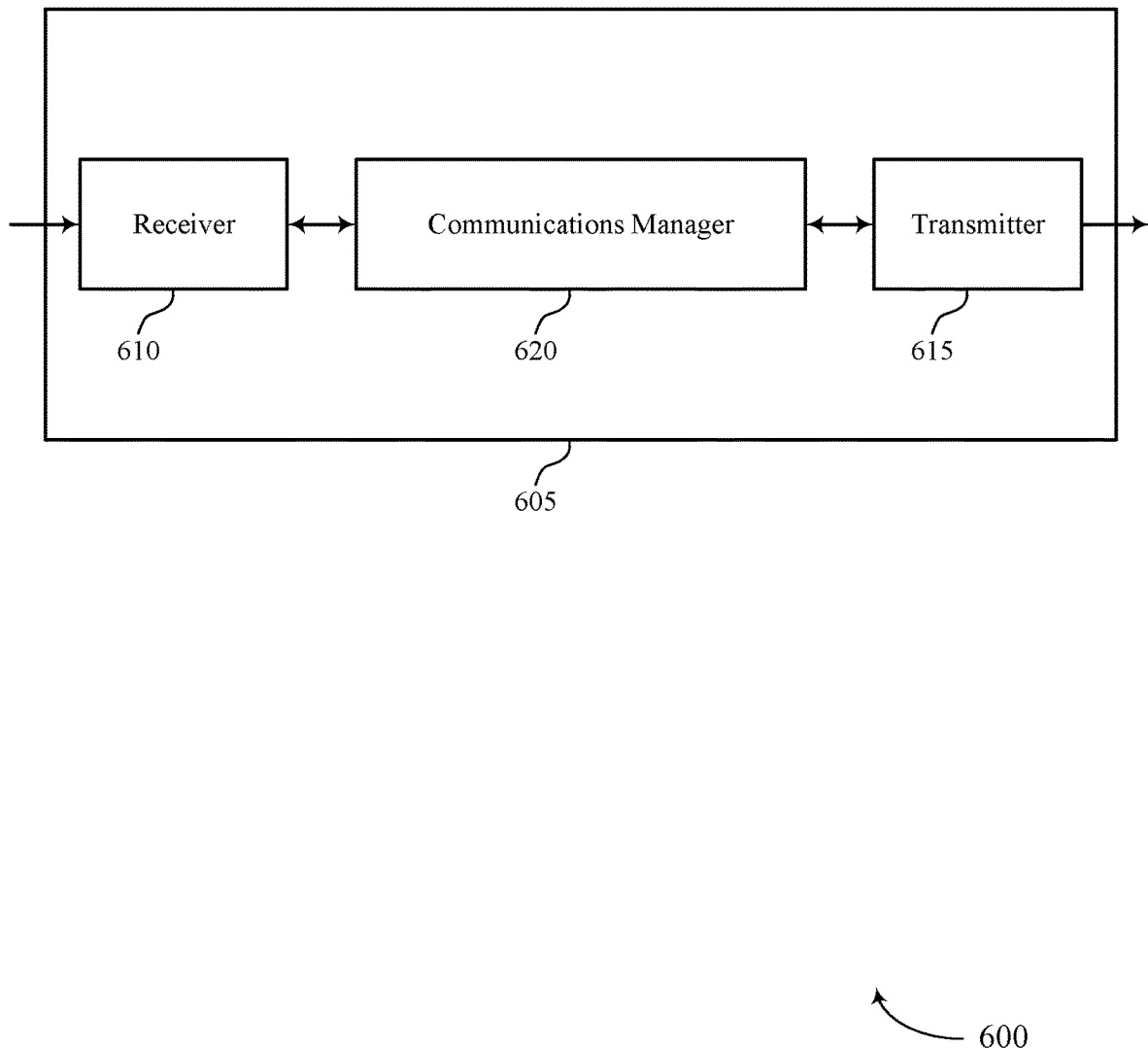
FIGS. 6 and 7 show block diagrams of devices that support continuous channel reservation for sidelink communication in accordance with various aspects of the present disclosure.

FIG. 6 shows a block diagram 600 of a device 605 that supports continuous channel reservation for sidelink communication in accordance with various aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to continuous channel reservation for sidelink communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to continuous channel reservation for sidelink communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of continuous channel reservation for sidelink communication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. For example, the communications manager 620 may be configured as or otherwise support a means for obtaining a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval. The communications manager 620 may be configured as or otherwise support a means for transmitting, during at least the portion of the first time interval and to a second UE, the first control information and the first data over a sidelink shared channel, the first control information indicating the second time interval. The communications manager 620 may be configured as or otherwise support a means for transmitting, during at least the portion of the second time interval, the second control information and the second data over the sidelink shared channel.

Additionally or alternatively, the communications manager 620 may support wireless communication at a first UE in accordance with examples as disclosed herein. For example, the communications manager 620 may be configured as or otherwise support a means for receiving, during at least a portion of a first time interval and from a second UE, first control information and first data over a sidelink shared channel during a COT in an unlicensed frequency spectrum band, the first control information indicating a second time interval subsequent to the first time interval. The communications manager 620 may be configured as or otherwise support a means for selectively performing communications during at least a portion of the second time interval based on receiving the first control information.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a UE 115 to indicate a time interval to another UE 115 for one or more sidelink transmission during a COT in an unlicensed frequency spectrum band, which may provide for reduced processing, reduced power consumption, more efficient utilization of communication resources, and the like at the UEs 115.

Figure 7:
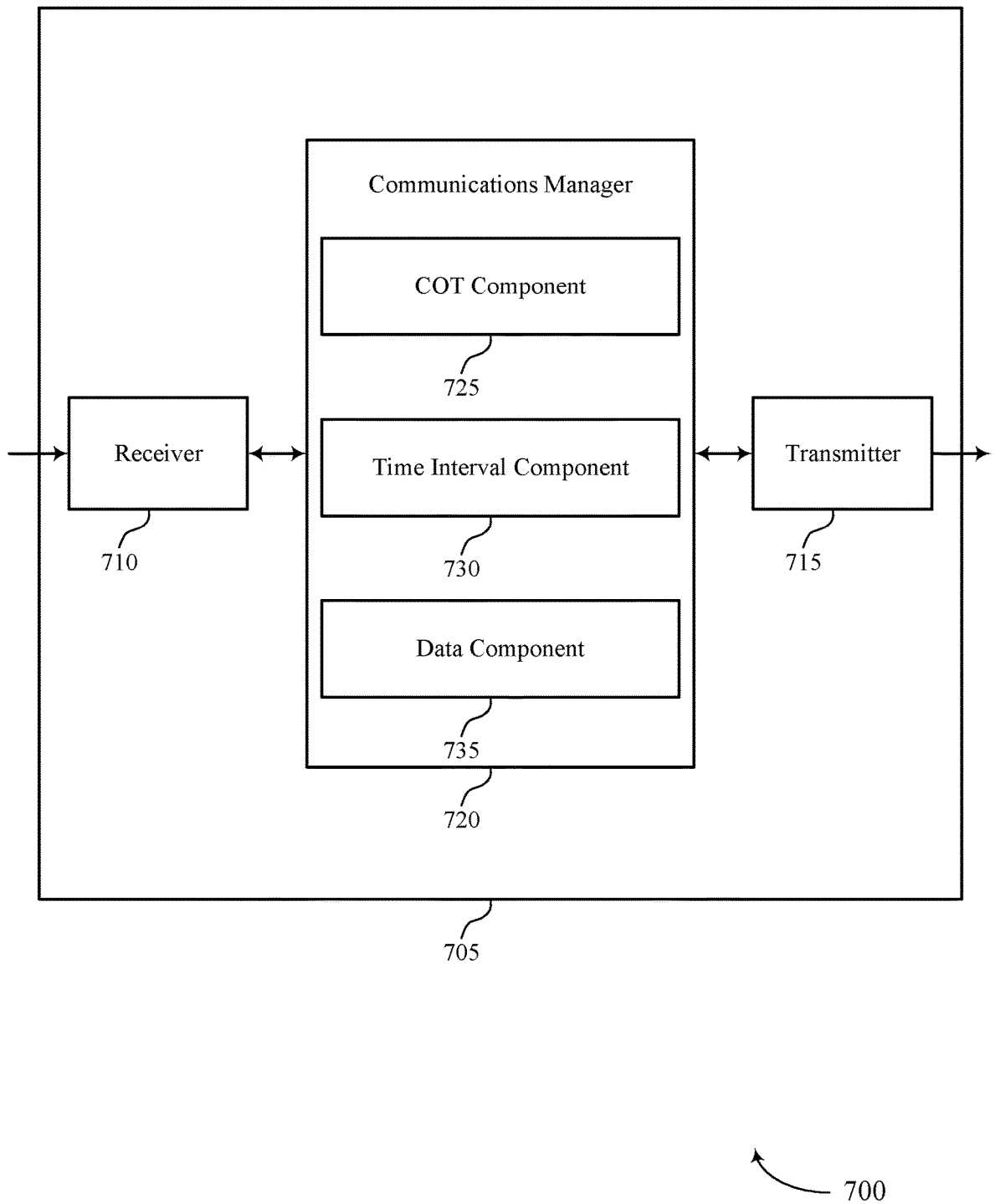

FIG. 7 shows a block diagram 700 of a device 705 that supports continuous channel reservation for sidelink communication in accordance with various aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to continuous channel reservation for sidelink communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to continuous channel reservation for sidelink communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of continuous channel reservation for sidelink communication as described herein. For example, the communications manager 720 may include a COT component 725, a time interval component 730, a data component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. The COT component 725 may be configured as or otherwise support a means for obtaining a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval. The time interval component 730 may be configured as or otherwise support a means for transmitting, during at least the portion of the first time interval and to a second UE, the first control information and the first data over a sidelink shared channel, the first control information indicating the second time interval. The data component 735 may be configured as or otherwise support a means for transmitting, during at least the portion of the second time interval, the second control information and the second data over the sidelink shared channel.

Additionally or alternatively, the communications manager 720 may support wireless communication at a first UE in accordance with examples as disclosed herein. The time interval component 730 may be configured as or otherwise support a means for receiving, during at least a portion of a first time interval and from a second UE, first control information and first data over a sidelink shared channel during a COT in an unlicensed frequency spectrum band, the first control information indicating a second time interval subsequent to the first time interval. The data component 735 may be configured as or otherwise support a means for selectively performing communications during at least a portion of the second time interval based on receiving the first control information.

Figure 8:
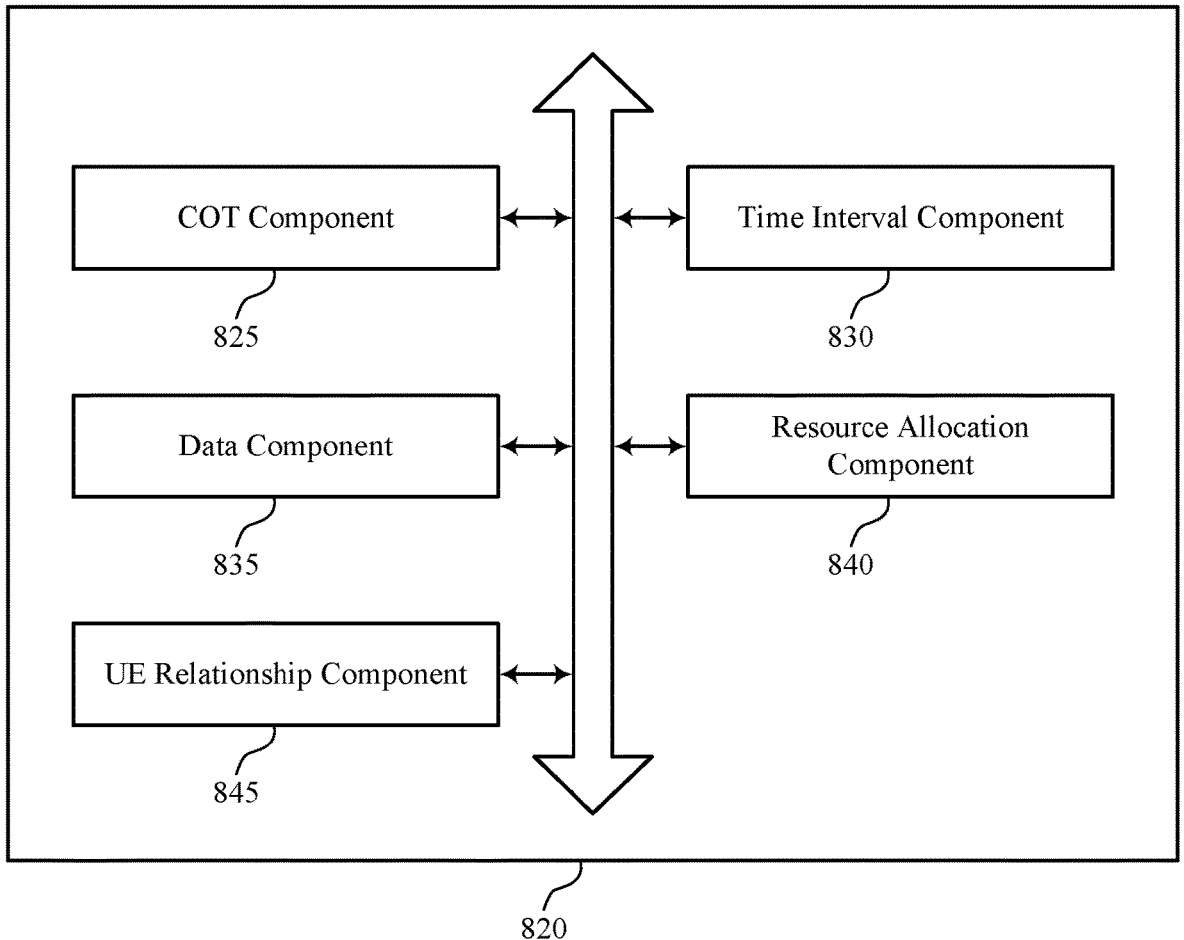
FIG. 8 shows a block diagram of a communications manager that supports continuous channel reservation for sidelink communication in accordance with various aspects of the present disclosure.

FIG. 8 shows a block diagram 800 of a communications manager 820 that supports continuous channel reservation for sidelink communication in accordance with various aspects of the present disclosure. The communications manager 820 may be an example of aspects of a communications manager 620, a communications manager 720, or both, as described herein. The communications manager 820, or various components thereof, may be an example of means for performing various aspects of continuous channel reservation for sidelink communication as described herein. For example, the communications manager 820 may include a COT component 825, a time interval component 830, a data component 835, a resource allocation component 840, a UE relationship component 845, or any combination thereof. Each of these components may communicate, directly or indirectly, with one another (e.g., via one or more buses).

The communications manager 820 may support wireless communication at a first UE in accordance with examples as disclosed herein. The COT component 825 may be configured as or otherwise support a means for obtaining a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval. The time interval component 830 may be configured as or otherwise support a means for transmitting, during at least the portion of the first time interval and to a second UE, the first control information and the first data over a sidelink shared channel, the first control information indicating the second time interval. The data component 835 may be configured as or otherwise support a means for transmitting, during at least the portion of the second time interval, the second control information and the second data over the sidelink shared channel.

In some examples, the resource allocation component 840 may be configured as or otherwise support a means for transmitting SCI to configure the second UE with a list of subchannels associated with the sidelink shared channel, each subchannel in the list of subchannels being within the second time interval, where the first control information includes the SCI.

In some examples, the resource allocation component 840 may be configured as or otherwise support a means for selecting one or more subchannels associated with a same frequency domain resource allocation as the sidelink shared channel, within a listen-before-talk subband occupied by the sidelink shared channel, or both. In some examples, the resource allocation component 840 may be configured as or otherwise support a means for transmitting the list of subchannels based on selecting the one or more subchannels, where the list of subchannels includes the one or more subchannels.

In some examples, the UE relationship component 845 may be configured as or otherwise support a means for transmitting the SCI based on a relationship between the first UE and the second UE, where the relationship corresponds to the first UE and the second UE being within a same zone, the first UE and the second UE being within a same UE group, or both.

In some examples, the UE relationship component 845 may be configured as or otherwise support a means for establishing the relationship via sidelink RRC signaling, according to a resource pool, or both.

In some examples, the SCI includes stage-one SCI or stage-two SCI.

In some examples, the resource allocation component 840 may be configured as or otherwise support a means for transmitting the first control information indicating the second time interval based on a resource pool of the first UE, the second UE, or both, where the first control information includes a frequency domain resource allocation field.

In some examples, the frequency domain resource allocation field indicates a set of multiple frequency domain resources associated with a set of multiple subchannels used to transmit the first data over the sidelink shared channel, and the resource allocation component 840 may be configured as or otherwise support a means for transmitting the second data over the set of multiple subchannels using the set of multiple frequency domain resources.

In some examples, the frequency domain resource allocation field indicates a set of multiple frequency domain resources for the second data, and the resource allocation component 840 may be configured as or otherwise support a means for transmitting the second data using the set of multiple frequency domain resources.

In some examples, the resource allocation component 840 may be configured as or otherwise support a means for transmitting the first control information including an indicator corresponding to a use of the second time interval or one or more time domain resource allocations, where a number of bits of the indicator corresponds to a number of time domain resource allocations of the one or more time domain resource allocations.

In some examples, the resource allocation component 840 may be configured as or otherwise support a means for transmitting SCI indicating the second time interval for transmission of the second control information and the second data and a time domain resource allocation indication for a retransmission of the first control information and the first data, where the first control information includes the SCI and the time domain resource allocation indication.

In some examples, the resource allocation component 840 may be configured as or otherwise support a means for transmitting the retransmission according to the time domain resource allocation indication prior to the second control information and the second data.

In some examples, the resource allocation component 840 may be configured as or otherwise support a means for transmitting a time domain resource allocation indicating the second time interval and a third time interval for a retransmission of the first control information and the first data, where the first control information includes the time domain resource allocation.

In some examples, the resource allocation component 840 may be configured as or otherwise support a means for receiving signaling configuring a resource pool for the first UE and the second UE, where the time domain resource allocation corresponds to the resource pool.

In some examples, the COT component 825 may be configured as or otherwise support a means for determining to perform COT sharing with the second UE based on the second time interval, a COT length, a channel access priority class, or any combination thereof. In some examples, the COT component 825 may be configured as or otherwise support a means for transmitting, to the second UE, an indication of the COT sharing, where the first control information includes the indication.

In some examples, the time interval component 830 may be configured as or otherwise support a means for transmitting first SCI including the second time interval. In some examples, the time interval component 830 may be configured as or otherwise support a means for transmitting second SCI including the indication.

In some examples, the time interval component 830 may be configured as or otherwise support a means for transmitting SCI including the second time interval and the indication.

In some examples, to support determining to perform COT sharing, the UE relationship component 845 may be configured as or otherwise support a means for determining the first UE and the second UE are within a same zone, share a unicast connection, or both.

In some examples, the first control information indicates a third time interval associated with third control information and third data, and the time interval component 830 may be configured as or otherwise support a means for transmitting, during at least a portion of the third time interval and subsequent to the second time interval, the third control information and the third data over the sidelink shared channel, where the second control information indicates the third time interval.

In some examples, to support obtaining the COT, the COT component 825 may be configured as or otherwise support a means for performing a channel access procedure to obtain the COT, where the channel access procedure includes a listen before talk procedure.

In some examples, the time interval component 830 may be configured as or otherwise support a means for determining a time delay between an end of the first time interval and a beginning of the second time interval exceeds a threshold amount of time.

In some examples, the time interval component 830 may be configured as or otherwise support a means for applying a cyclic prefix extension to the second control information based on the time delay exceeding the threshold amount of time.

In some examples, the time interval component 830 may be configured as or otherwise support a means for transmitting the second control information to the second UE or to another UE.

In some examples, the second data includes a retransmission of the first data.

In some examples, the second data is different from the first data.

Additionally or alternatively, the communications manager 820 may support wireless communication at a first UE in accordance with examples as disclosed herein. In some examples, the time interval component 830 may be configured as or otherwise support a means for receiving, during at least a portion of a first time interval and from a second UE, first control information and first data over a sidelink shared channel during a COT in an unlicensed frequency spectrum band, the first control information indicating a second time interval subsequent to the first time interval. In some examples, the data component 835 may be configured as or otherwise support a means for selectively performing communications during at least a portion of the second time interval based on receiving the first control information.

In some examples, the resource allocation component 840 may be configured as or otherwise support a means for receiving SCI to configure the first UE with a list of subchannels associated with the sidelink shared channel, each subchannel in the list of subchannels being within the second time interval, where the first control information includes the SCI. In some examples, the resource allocation component 840 may be configured as or otherwise support a means for identifying one or more subchannels in the list of subchannels as unavailable for the communications based on receiving the SCI.

In some examples, the UE relationship component 845 may be configured as or otherwise support a means for receiving the SCI based on a relationship between the first UE and the second UE, where the relationship corresponds to the first UE and the second UE being within a same zone, the first UE and the second UE being within a same UE group, or both.

In some examples, the UE relationship component 845 may be configured as or otherwise support a means for establishing the relationship via sidelink RRC signaling, according to a resource pool, or both.

In some examples, the SCI includes stage-one SCI or stage-two SCI.

In some examples, the resource allocation component 840 may be configured as or otherwise support a means for receiving the first control information indicating the second time interval based on a resource pool of the first UE, the second UE, or both, where the first control information includes a frequency domain resource allocation field.

In some examples, the resource allocation component 840 may be configured as or otherwise support a means for receiving the first control information including an indicator corresponding to a use of the second time interval or one or more time domain resource allocations, where a number of bits of the indicator corresponds to a number of time domain resource allocations of the one or more time domain resource allocations.

In some examples, the resource allocation component 840 may be configured as or otherwise support a means for receiving SCI indicating the second time interval and a time domain resource allocation indication for a retransmission of the first control information and the first data, where the first control information includes the SCI and the time domain resource allocation indication. In some examples, the resource allocation component 840 may be configured as or otherwise support a means for determining to perform the communications based on receiving the SCI, where the communications include receiving the retransmission of the first control information and the first data according to the time domain resource allocation indication.

In some examples, the resource allocation component 840 may be configured as or otherwise support a means for receiving a time domain resource allocation indicating the second time interval and a third time interval for a retransmission of the first control information and the first data, where the first control information includes the time domain resource allocation. In some examples, the resource allocation component 840 may be configured as or otherwise support a means for determining to perform the communications based on receiving the time domain resource allocation, where the communications include receiving, during the third time interval, the retransmission of the first control information and the first data according to the time domain resource allocation.

In some examples, the COT component 825 may be configured as or otherwise support a means for receiving, from the first UE, an indication of COT sharing including the second time interval, a COT length, a channel access priority class, or any combination thereof, where the first control information includes the indication. In some examples, the COT component 825 may be configured as or otherwise support a means for determining to perform the communications during the COT based on receiving the indication, where the communications include receiving signaling, transmitting signaling, or both in accordance with the COT sharing.

In some examples, the time interval component 830 may be configured as or otherwise support a means for receiving first SCI including the second time interval. In some examples, the time interval component 830 may be configured as or otherwise support a means for receiving second SCI including the indication.

In some examples, the time interval component 830 may be configured as or otherwise support a means for receiving SCI including the second time interval and the indication.

In some examples, the time interval component 830 may be configured as or otherwise support a means for receiving, for the second time interval, second control information and second data over the sidelink shared channel.

Figure 9:
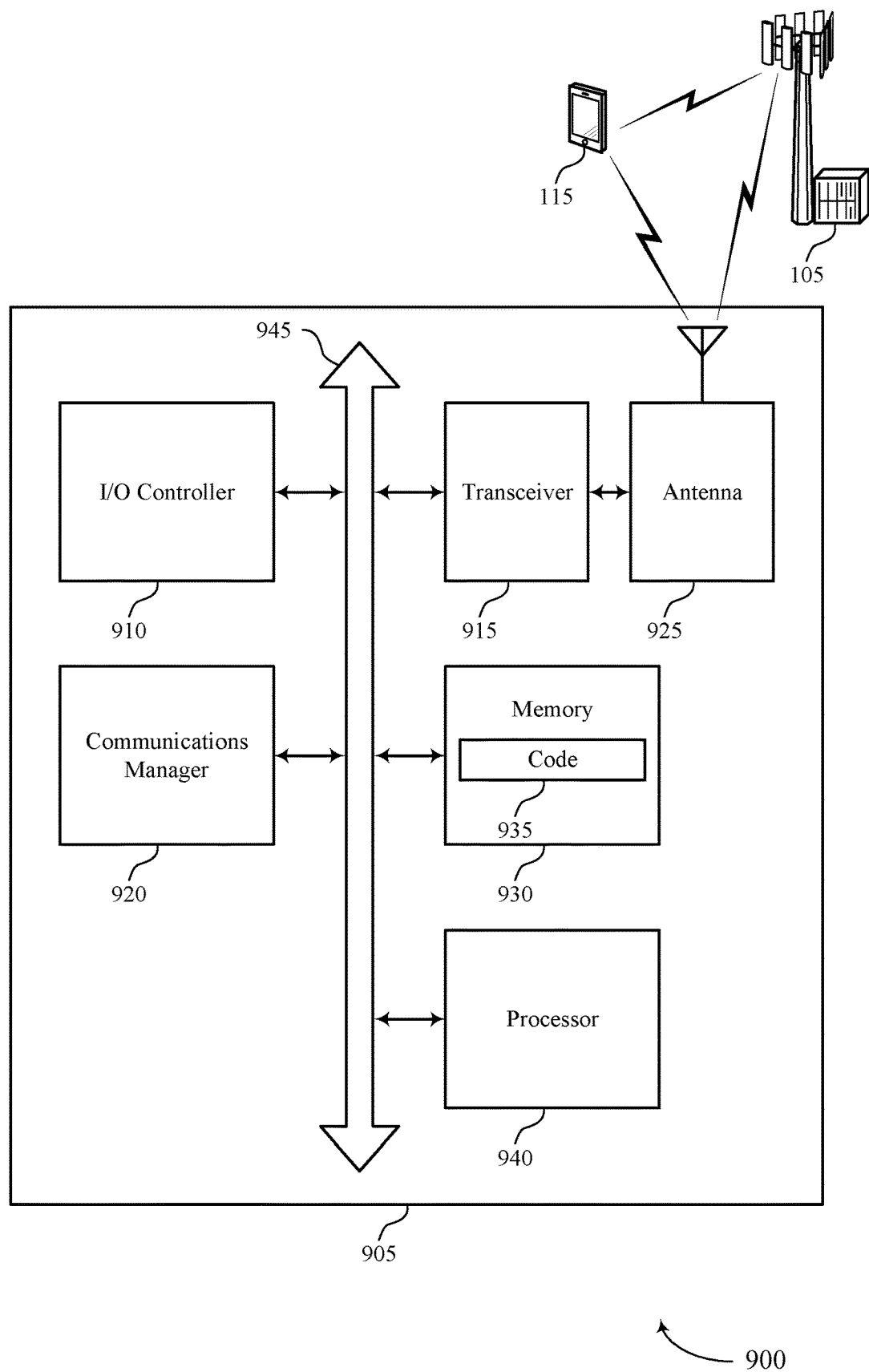
FIG. 9 shows a diagram of a system including a device that supports continuous channel reservation for sidelink communication in accordance with various aspects of the present disclosure.

FIG. 9 shows a diagram of a system 900 including a device 905 that supports continuous channel reservation for sidelink communication in accordance with various aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting continuous channel reservation for sidelink communication). For example, the device 905 or a component of the device 905 may include a processor 940 and memory 930 coupled with or to the processor 940, the processor 940 and memory 930 configured to perform various functions described herein.

The communications manager 920 may support wireless communication at a first UE in accordance with examples as disclosed herein. For example, the communications manager 920 may be configured as or otherwise support a means for obtaining a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval. The communications manager 920 may be configured as or otherwise support a means for transmitting, during at least the portion of the first time interval and to a second UE, the first control information and the first data over a sidelink shared channel, the first control information indicating the second time interval. The communications manager 920 may be configured as or otherwise support a means for transmitting, during at least the portion of the second time interval, the second control information and the second data over the sidelink shared channel.

Additionally or alternatively, the communications manager 920 may support wireless communication at a first UE in accordance with examples as disclosed herein. For example, the communications manager 920 may be configured as or otherwise support a means for receiving, during at least a portion of a first time interval and from a second UE, first control information and first data over a sidelink shared channel during a COT in an unlicensed frequency spectrum band, the first control information indicating a second time interval subsequent to the first time interval. The communications manager 920 may be configured as or otherwise support a means for selectively performing communications during at least a portion of the second time interval based on receiving the first control information.

By including or configuring the communications manager 920 in accordance with examples as described herein, the device 905 may support techniques for a UE 115 to indicate a time interval to another UE 115 for one or more sidelink transmission during a COT in an unlicensed frequency spectrum band, which may provide for improved communication reliability, reduced latency, improved user experience related to reduced processing, reduced power consumption, more efficient utilization of communication resources, improved coordination between devices, longer battery life, improved utilization of processing capability, and the like at the UEs 115

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of continuous channel reservation for sidelink communication as described herein, or the processor 940 and the memory 930 may be otherwise configured to perform or support such operations.

Figure 10:
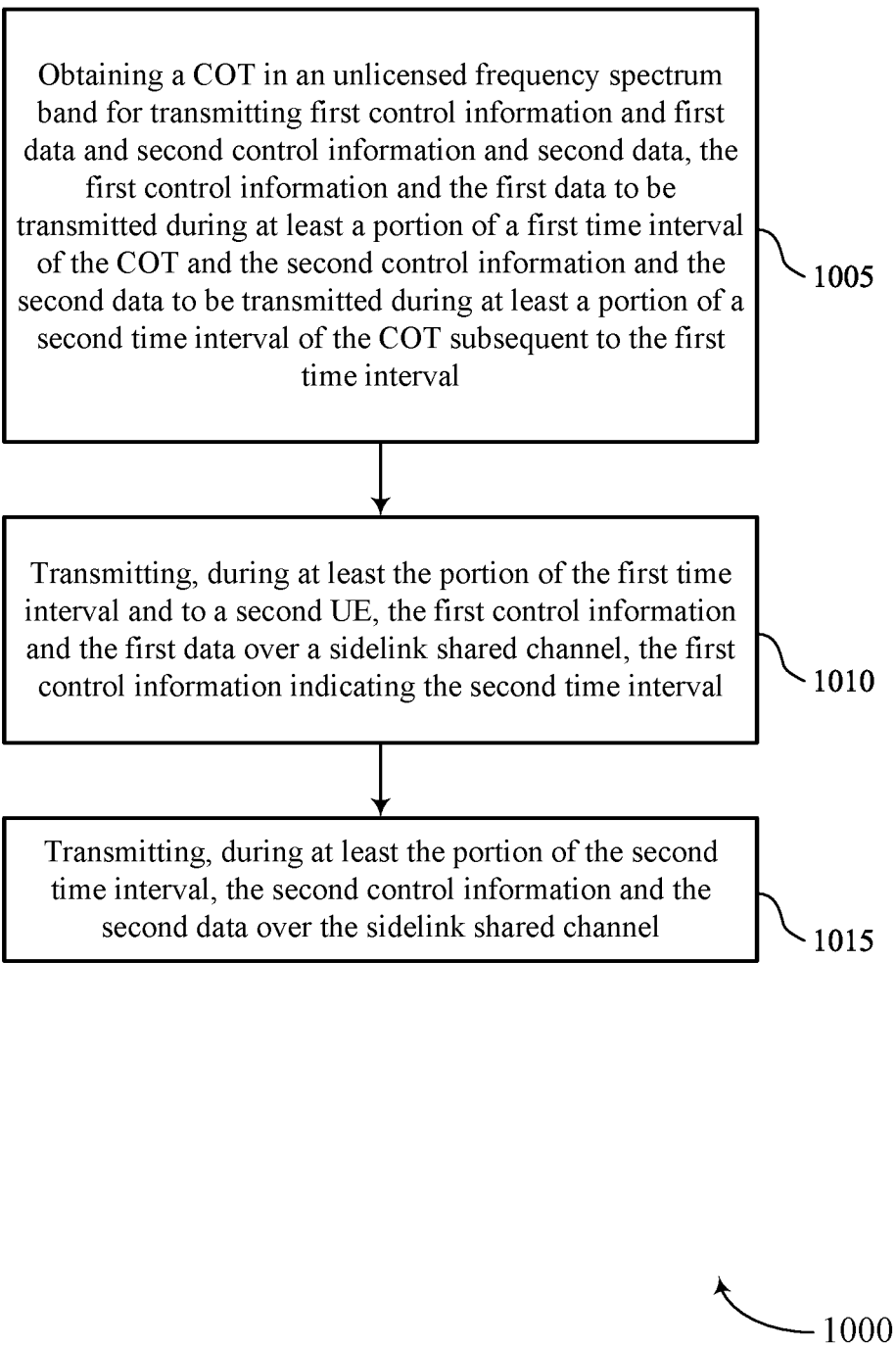
FIGS. 10 through 14 show flowcharts illustrating continuous channel reservation for sidelink communication in accordance with various aspects of the present disclosure.

FIG. 10 shows a flowchart illustrating a method 1000 that supports continuous channel reservation for sidelink communication in accordance with various aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include obtaining a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval. The operations of 1005 may be performed in accordance with examples as disclosed herein. In some examples, aspects of the operations of 1005 may be performed by a COT component 825 as described with reference to FIG. 8.

At 1010, the method may include transmitting, during at least the portion of the first time interval and to a second UE, the first control information and the first data over a sidelink shared channel, the first control information indicating the second time interval. The operations of 1010 may be performed in accordance with examples as disclosed herein. In some examples, aspects of the operations of 1010 may be performed by a time interval component 830 as described with reference to FIG. 8.

At 1015, the method may include transmitting, during at least the portion of the second time interval, the second control information and the second data over the sidelink shared channel. The operations of 1015 may be performed in accordance with examples as disclosed herein. In some examples, aspects of the operations of 1015 may be performed by a data component 835 as described with reference to FIG. 8.

Figure 11:
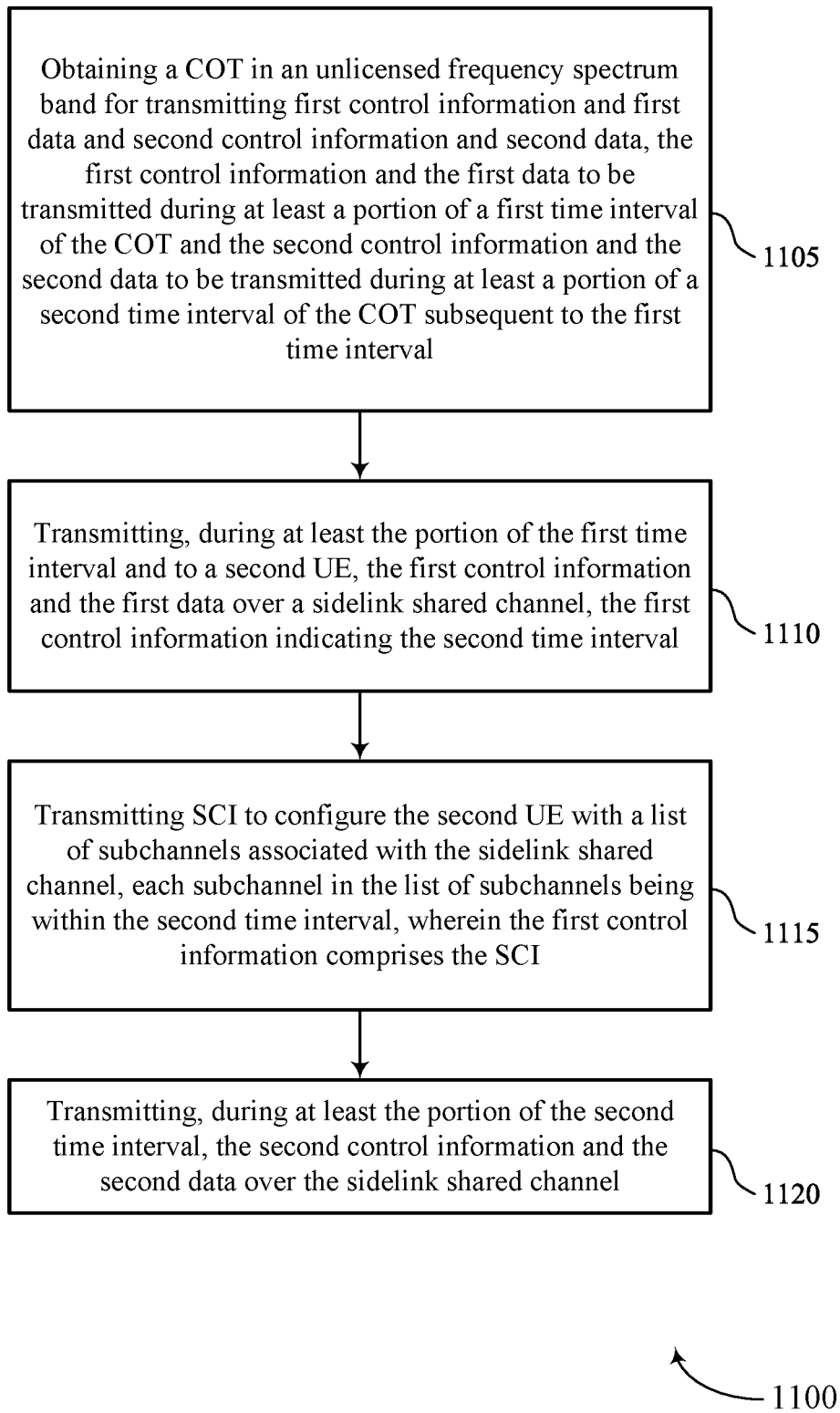

FIG. 11 shows a flowchart illustrating a method 1100 that supports continuous channel reservation for sidelink communication in accordance with various aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include obtaining a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval. The operations of 1105 may be performed in accordance with examples as disclosed herein. In some examples, aspects of the operations of 1105 may be performed by a COT component 825 as described with reference to FIG. 8.

At 1110, the method may include transmitting, during at least the portion of the first time interval and to a second UE, the first control information and the first data over a sidelink shared channel, the first control information indicating the second time interval. The operations of 1110 may be performed in accordance with examples as disclosed herein. In some examples, aspects of the operations of 1110 may be performed by a time interval component 830 as described with reference to FIG. 8.

At 1115, the method may include transmitting SCI to configure the second UE with a list of subchannels associated with the sidelink shared channel, each subchannel in the list of subchannels being within the second time interval, where the first control information includes the SCI. The operations of 1115 may be performed in accordance with examples as disclosed herein. In some examples, aspects of the operations of 1115 may be performed by a resource allocation component 840 as described with reference to FIG. 8.

At 1120, the method may include transmitting, during at least the portion of the second time interval, the second control information and the second data over the sidelink shared channel. The operations of 1120 may be performed in accordance with examples as disclosed herein. In some examples, aspects of the operations of 1120 may be performed by a data component 835 as described with reference to FIG. 8.

Figure 12:
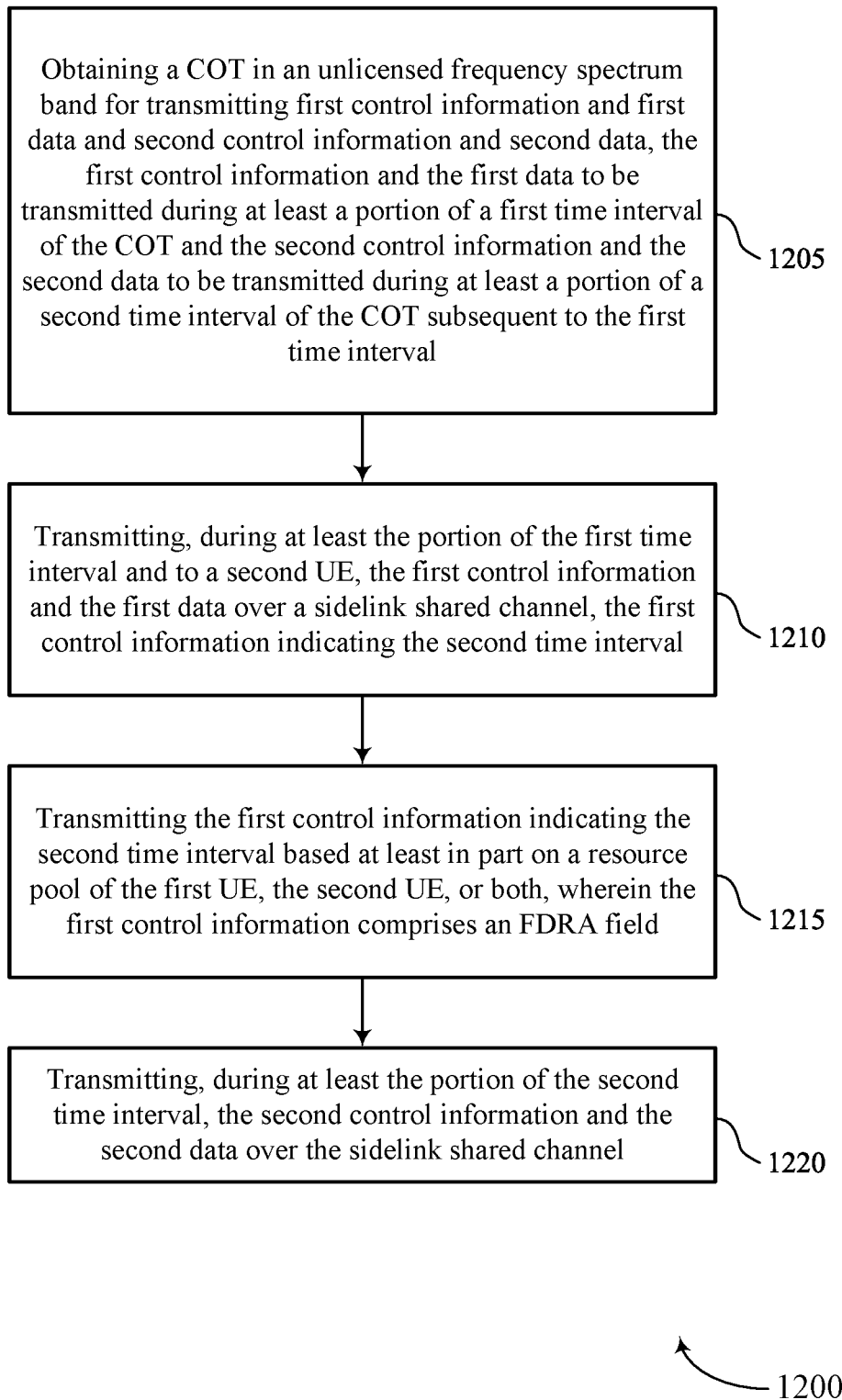

FIG. 12 shows a flowchart illustrating a method 1200 that supports continuous channel reservation for sidelink communication in accordance with various aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include obtaining a COT in an unlicensed frequency spectrum band for transmitting first control information and first data and second control information and second data, the first control information and the first data to be transmitted during at least a portion of a first time interval of the COT and the second control information and the second data to be transmitted during at least a portion of a second time interval of the COT subsequent to the first time interval. The operations of 1205 may be performed in accordance with examples as disclosed herein. In some examples, aspects of the operations of 1205 may be performed by a COT component 825 as described with reference to FIG. 8.

At 1210, the method may include transmitting, during at least the portion of the first time interval and to a second UE, the first control information and the first data over a sidelink shared channel, the first control information indicating the second time interval. The operations of 1210 may be performed in accordance with examples as disclosed herein. In some examples, aspects of the operations of 1210 may be performed by a time interval component 830 as described with reference to FIG. 8.

At 1215, the method may include transmitting the first control information indicating the second time interval based on a resource pool of the first UE, the second UE, or both, where the first control information includes a frequency domain resource allocation field. The operations of 1215 may be performed in accordance with examples as disclosed herein. In some examples, aspects of the operations of 1215 may be performed by a resource allocation component 840 as described with reference to FIG. 8.

At 1220, the method may include transmitting, during at least the portion of the second time interval, the second control information and the second data over the sidelink shared channel. The operations of 1220 may be performed in accordance with examples as disclosed herein. In some examples, aspects of the operations of 1220 may be performed by a data component 835 as described with reference to FIG. 8.

Figure 13:
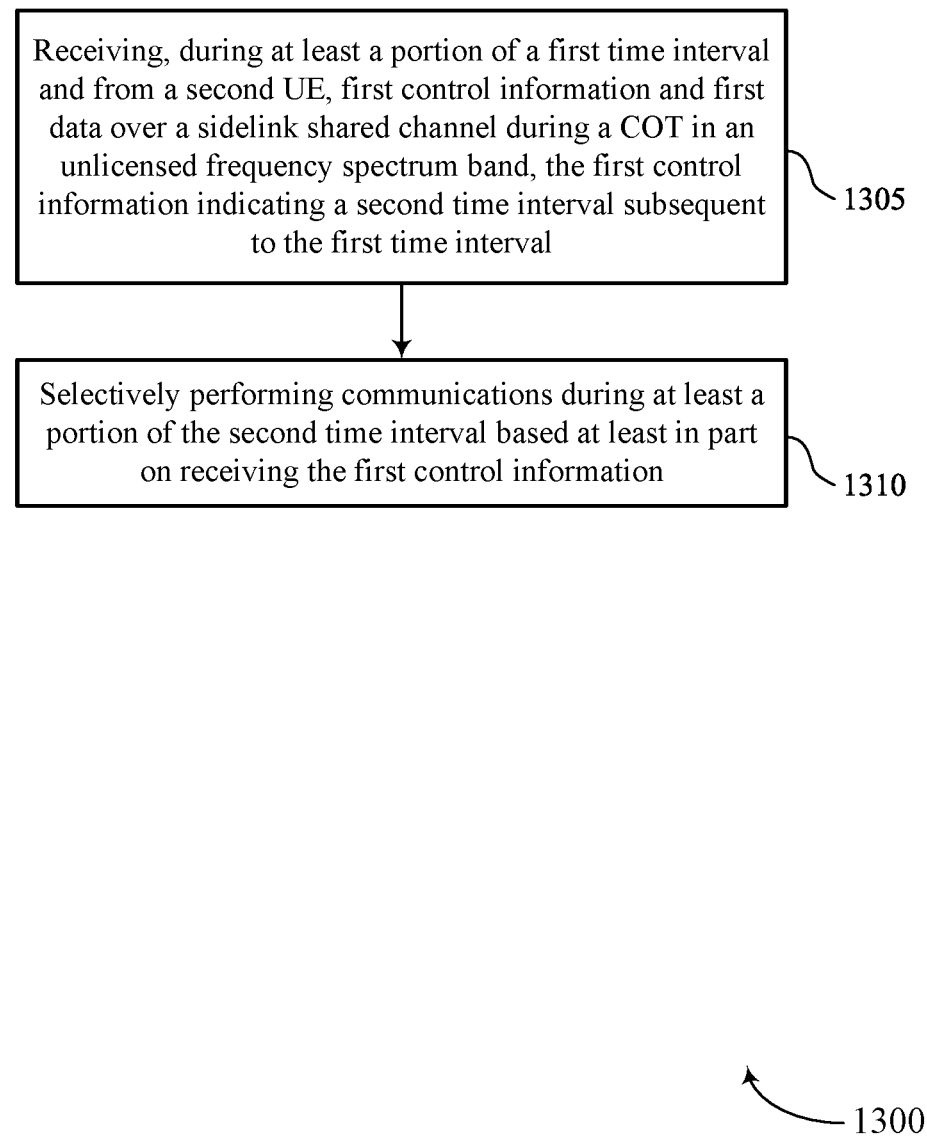

FIG. 13 shows a flowchart illustrating a method 1300 that supports continuous channel reservation for sidelink communication in accordance with various aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, during at least a portion of a first time interval and from a second UE, first control information and first data over a sidelink shared channel during a COT in an unlicensed frequency spectrum band, the first control information indicating a second time interval subsequent to the first time interval. The operations of 1305 may be performed in accordance with examples as disclosed herein. In some examples, aspects of the operations of 1305 may be performed by a time interval component 830 as described with reference to FIG. 8.

At 1310, the method may include selectively performing communications during at least a portion of the second time interval based on receiving the first control information. The operations of 1310 may be performed in accordance with examples as disclosed herein. In some examples, aspects of the operations of 1310 may be performed by a data component 835 as described with reference to FIG. 8.

Figure 14:
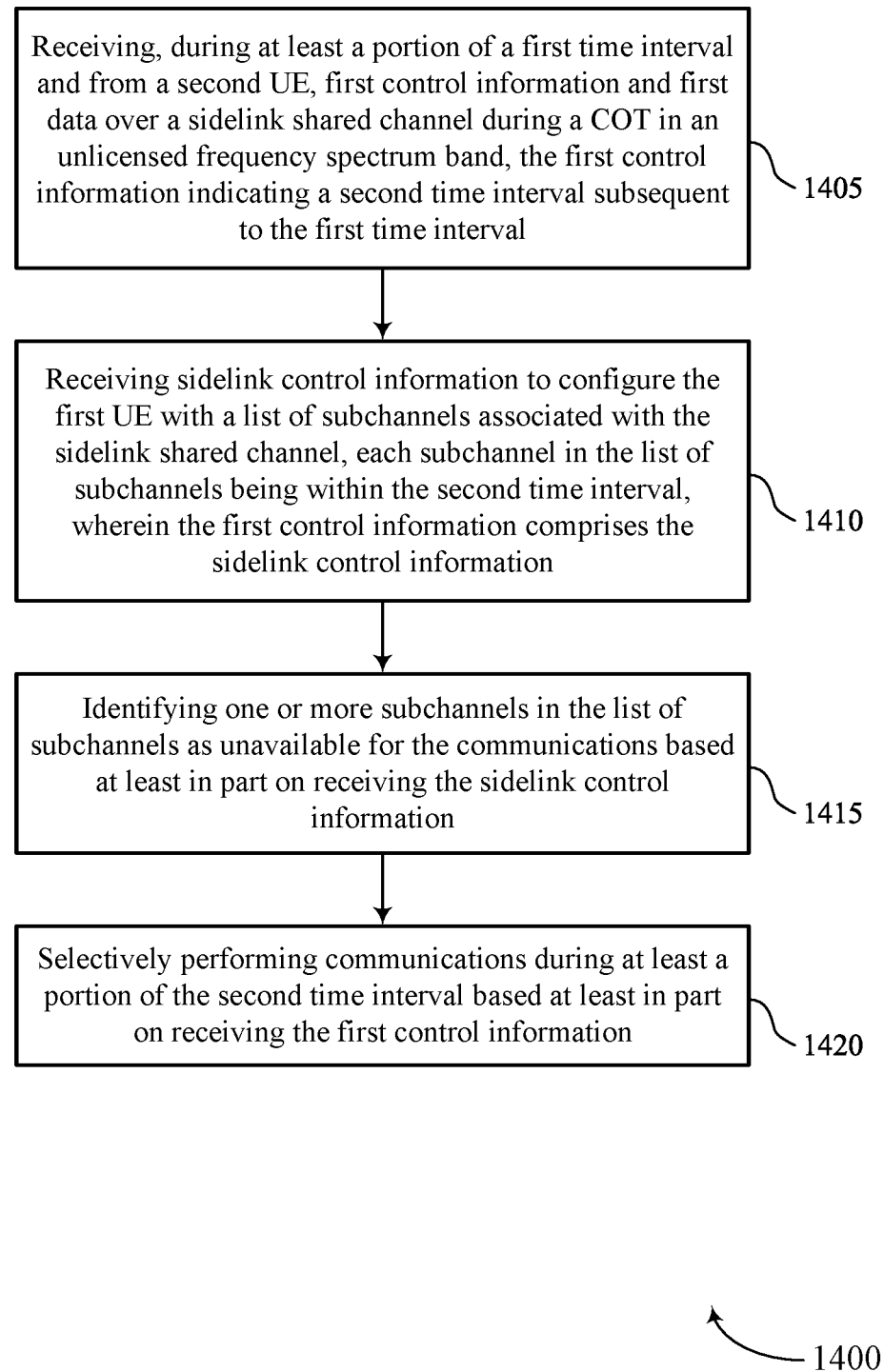

FIG. 14 shows a flowchart illustrating a method 1400 that supports continuous channel reservation for sidelink communication in accordance with various aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, during at least a portion of a first time interval and from a second UE, first control information and first data over a sidelink shared channel during a COT in an unlicensed frequency spectrum band, the first control information indicating a second time interval subsequent to the first time interval. The operations of 1405 may be performed in accordance with examples as disclosed herein. In some examples, aspects of the operations of 1405 may be performed by a time interval component 830 as described with reference to FIG. 8.

At 1410, the method may include receiving SCI to configure the first UE with a list of subchannels associated with the sidelink shared channel, each subchannel in the list of subchannels being within the second time interval, where the first control information includes the SCI. The operations of 1410 may be performed in accordance with examples as disclosed herein. In some examples, aspects of the operations of 1410 may be performed by a resource allocation component 840 as described with reference to FIG. 8.

At 1415, the method may include identifying one or more subchannels in the list of subchannels as unavailable for the communications based on receiving the SCI. The operations of 1415 may be performed in accordance with examples as disclosed herein. In some examples, aspects of the operations of 1415 may be performed by a resource allocation component 840 as described with reference to FIG. 8.

At 1420, the method may include selectively performing communications during at least a portion of the second time interval based on receiving the first control information. The operations of 1420 may be performed in accordance with examples as disclosed herein. In some examples, aspects of the operations of 1420 may be performed by a data component 835 as described with reference to FIG. 8.

The following provides an overview of aspects of the present disclosure:

Aspect 1: A method for wireless communication at a first UE, comprising: obtaining a channel occupancy time in an unlicensed frequency spectrum band for transmitting first control information and first data and second control information and second data, the first control information and the first data to be transmitted during at least a portion of a first time interval of the channel occupancy time and the second control information and the second data to be transmitted during at least a portion of a second time interval of the channel occupancy time subsequent to the first time interval; transmitting, during at least the portion of the first time interval and to a second UE, the first control information and the first data over a sidelink shared channel, the first control information indicating the second time interval; and transmitting, during at least the portion of the second time interval, the second control information and the second data over the sidelink shared channel.

Aspect 2: The method of aspect 1 further comprising: transmitting sidelink control information to configure the second UE with a list of subchannels associated with the sidelink shared channel, each subchannel in the list of subchannels being within the second time interval, wherein the first control information comprises the sidelink control information.

Aspect 3: The method of aspect 2 further comprising: selecting one or more subchannels associated with a same frequency domain resource allocation as the sidelink shared channel, within a listen-before-talk subband occupied by the sidelink shared channel, or both; and transmitting the list of subchannels based at least in part on selecting the one or more subchannels, wherein the list of subchannels comprises the one or more subchannels.

Aspect 4: The method of any of aspects 2 through 3 further comprising: transmitting the sidelink control information based at least in part on a relationship between the first UE and the second UE, wherein the relationship corresponds to the first UE and the second UE being within a same zone, the first UE and the second UE being within a same UE group, or both.

Aspect 5: The method of aspect 4 further comprising: establishing the relationship via sidelink radio resource control signaling, according to a resource pool, or both.

Aspect 6: The method of any of aspects 2 through 5, wherein the sidelink control information comprises stage-one sidelink control information or stage-two sidelink control information.

Aspect 7: The method of any of aspects 1 through 6 further comprising: transmitting the first control information indicating the second time interval based at least in part on a resource pool of the first UE, the second UE, or both, wherein the first control information comprises a frequency domain resource allocation field.

Aspect 8: The method of aspect 7, wherein the frequency domain resource allocation field indicates a plurality of frequency domain resources associated with a plurality of subchannels used to transmit the first data over the sidelink shared channel, the method further comprising: transmitting the second data over the plurality of subchannels using the plurality of frequency domain resources.

Aspect 9: The method of any of aspects 7 through 8, wherein the frequency domain resource allocation field indicates a plurality of frequency domain resources for the second data, the method further comprising: transmitting the second data using the plurality of frequency domain resources.

Aspect 10: The method of any of aspects 1 through 9 further comprising: transmitting the first control information comprising an indicator corresponding to a use of the second time interval or one or more time domain resource allocations, wherein a number of bits of the indicator corresponds to a number of time domain resource allocations of the one or more time domain resource allocations.

Aspect 11: The method of any of aspects 1 through 10 further comprising: transmitting sidelink control information indicating the second time interval for transmission of the second control information and the second data and a time domain resource allocation indication for a retransmission of the first control information and the first data, wherein the first control information comprises the sidelink control information and the time domain resource allocation indication.

Aspect 12: The method of aspect 11 further comprising: transmitting the retransmission according to the time domain resource allocation indication prior to the second control information and the second data.

Aspect 13: The method of any of aspects 1 through 12 further comprising: transmitting a time domain resource allocation indicating the second time interval and a third time interval for a retransmission of the first control information and the first data, wherein the first control information comprises the time domain resource allocation.

Aspect 14: The method of aspect 13 further comprising: receiving signaling configuring a resource pool for the first UE and the second UE, wherein the time domain resource allocation corresponds to the resource pool.

Aspect 15: The method of any of aspects 1 through 14 further comprising: determining to perform channel occupancy time sharing with the second UE based at least in part on the second time interval, a channel occupancy time length, a channel access priority class, or any combination thereof; and transmitting, to the second UE, an indication of the channel occupancy time sharing, wherein the first control information comprises the indication.

Aspect 16: The method of aspect 15 further comprising: transmitting first sidelink control information comprising the second time interval; and transmitting second sidelink control information comprising the indication.

Aspect 17: The method of any of aspects 15 through 16 further comprising: transmitting sidelink control information comprising the second time interval and the indication.

Aspect 18: The method of any of aspects 15 through 17, wherein determining to perform channel occupancy time sharing comprises: determining the first UE and the second UE are within a same zone, share a unicast connection, or both.

Aspect 19: The method of any of aspects 1 through 18, wherein the first control information indicates a third time interval associated with third control information and third data, the method further comprising: transmitting, during at least a portion of the third time interval and subsequent to the second time interval, the third control information and the third data over the sidelink shared channel, wherein the second control information indicates the third time interval.

Aspect 20: The method of any of aspects 1 through 19, wherein obtaining the channel occupancy time further comprises: performing a channel access procedure to obtain the channel occupancy time, wherein the channel access procedure comprises a listen before talk procedure.

Aspect 21: The method of any of aspects 1 through 20 further comprising: determining a time delay between an end of the first time interval and a beginning of the second time interval exceeds a threshold amount of time; and applying a cyclic prefix extension to the second control information based at least in part on the time delay exceeding the threshold amount of time.

Aspect 22: The method of any of aspects 1 through 21 further comprising: transmitting the second control information to the second UE or to another UE.

Aspect 23: The method of any of aspects 1 through 22, wherein the second data comprises a retransmission of the first data.

Aspect 24: The method of any of aspects 1 through 22, wherein the second data is different from the first data.

Aspect 25: A method for wireless communication at a first UE, comprising: receiving, during at least a portion of a first time interval and from a second UE, first control information and first data over a sidelink shared channel during a channel occupancy time in an unlicensed frequency spectrum band, the first control information indicating a second time interval subsequent to the first time interval; and selectively performing communications during at least a portion of the second time interval based at least in part on receiving the first control information.

Aspect 26: The method of aspect 25 further comprising: receiving sidelink control information to configure the first UE with a list of subchannels associated with the sidelink shared channel, each subchannel in the list of subchannels being within the second time interval, wherein the first control information comprises the sidelink control information; and identifying one or more subchannels in the list of subchannels as unavailable for the communications based at least in part on receiving the sidelink control information.

Aspect 27: The method of aspect 26 further comprising: receiving the sidelink control information based at least in part on a relationship between the first UE and the second UE, wherein the relationship corresponds to the first UE and the second UE being within a same zone, the first UE and the second UE being within a same UE group, or both.

Aspect 28: The method of aspect 27 further comprising: establishing the relationship via sidelink radio resource control signaling, according to a resource pool, or both.

Aspect 29: The method of any of aspects 26 through 28, wherein the sidelink control information comprises stage-one sidelink control information or stage-two sidelink control information.

Aspect 30: The method of any of aspects 25 through 29 further comprising: receiving the first control information indicating the second time interval based at least in part on a resource pool of the first UE, the second UE, or both, wherein the first control information comprises a frequency domain resource allocation field.

Aspect 31: The method of any of aspects 25 through 30 further comprising: receiving the first control information comprising an indicator corresponding to a use of the second time interval or one or more time domain resource allocations, wherein a number of bits of the indicator corresponds to a number of time domain resource allocations of the one or more time domain resource allocations.

Aspect 32: The method of any of aspects 25 through 31 further comprising: receiving sidelink control information indicating the second time interval and a time domain resource allocation indication for a retransmission of the first control information and the first data, wherein the first control information comprises the sidelink control information and the time domain resource allocation indication; and determining to perform the communications based at least in part on receiving the sidelink control information, wherein the communications comprise receiving the retransmission of the first control information and the first data according to the time domain resource allocation indication.

Aspect 33: The method of any of aspects 25 through 32 further comprising: receiving a time domain resource allocation indicating the second time interval and a third time interval for a retransmission of the first control information and the first data, wherein the first control information comprises the time domain resource allocation; and determining to perform the communications based at least in part on receiving the time domain resource allocation, wherein the communications comprise receiving, during the third time interval, the retransmission of the first control information and the first data according to the time domain resource allocation.

Aspect 34: The method of any of aspects 25 through 33 further comprising: receiving, from the first UE, an indication of channel occupancy time sharing comprising the second time interval, a channel occupancy time length, a channel access priority class, or any combination thereof, wherein the first control information comprises the indication; and determining to perform the communications during the channel occupancy time based at least in part on receiving the indication, wherein the communications comprise receiving signaling, transmitting signaling, or both in accordance with the channel occupancy time sharing.

Aspect 35: The method of aspect 34 further comprising: receiving first sidelink control information comprising the second time interval; and receiving second sidelink control information comprising the indication.

Aspect 36: The method of any of aspects 34 through 35 further comprising: receiving sidelink control information comprising the second time interval and the indication.

Aspect 37: The method of any of aspects 25 through 36 further comprising: receiving, for the second time interval, second control information and second data over the sidelink shared channel.

Aspect 38: An apparatus for wireless communication at a first UE, comprising a processor; memory coupled with the processor; and instructions stored in the memory and executable by the processor to cause the apparatus to perform a method of any of aspects 1 through 24.

Aspect 39: An apparatus for wireless communication at a first UE, comprising at least one means for performing a method of any of aspects 1 through 24.

Aspect 40: A non-transitory computer-readable medium storing code for wireless communication at a first UE, the code comprising instructions executable by a processor to perform a method of any of aspects 1 through 24.

Aspect 41: An apparatus for wireless communication at a first UE, comprising a processor; memory coupled with the processor; and instructions stored in the memory and executable by the processor to cause the apparatus to perform a method of any of aspects 25 through 37.

Aspect 42: An apparatus for wireless communication at a first UE, comprising at least one means for performing a method of any of aspects 25 through 37.

Aspect 43: A non-transitory computer-readable medium storing code for wireless communication at a first UE, the code comprising instructions executable by a processor to perform a method of any of aspects 25 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   obtaining a channel occupancy time in an unlicensed frequency spectrum band for transmitting first control information and first data and second control information and second data, the first control information and the first data to be transmitted during at least a portion of a first time interval of the channel occupancy time and the second control information and the second data to be transmitted during at least a portion of a second time interval of the channel occupancy time subsequent to the first time interval;
   transmitting, during at least the portion of the first time interval and to a second UE, the first control information and the first data over a sidelink shared channel, the first control information indicating the second time interval; and
   transmitting, during at least the portion of the second time interval, the second control information and the second data over the sidelink shared channel.

2. The method of claim 1 further comprising:
transmitting sidelink control information to configure the second UE with a list of subchannels associated with the sidelink shared channel, each subchannel in the list of subchannels being within the second time interval, wherein the first control information comprises the sidelink control information.

3. The method of claim 2 further comprising:
selecting one or more subchannels associated with a same frequency domain resource allocation as the sidelink shared channel, within a listen-before-talk subband occupied by the sidelink shared channel, or both; and
transmitting the list of subchannels based at least in part on selecting the one or more subchannels, wherein the list of subchannels comprises the one or more subchannels.

4. The method of claim 2 further comprising:
transmitting the sidelink control information based at least in part on a relationship between the first UE and the second UE, wherein the relationship corresponds to the first UE and the second UE being within a same zone, the first UE and the second UE being within a same UE group, or both.

5. The method of claim 4 further comprising:
establishing the relationship via sidelink radio resource control signaling, according to a resource pool, or both.

6. The method of claim 2, wherein the sidelink control information comprises stage-one sidelink control information or stage-two sidelink control information.

7. The method of claim 1 further comprising:
transmitting the first control information indicating the second time interval based at least in part on a resource pool of the first UE, the second UE, or both, wherein the first control information comprises a frequency domain resource allocation field.

8. The method of claim 7, wherein the frequency domain resource allocation field indicates a plurality of frequency domain resources associated with a plurality of subchannels used to transmit the first data over the sidelink shared channel, the method further comprising:
transmitting the second data over the plurality of subchannels using the plurality of frequency domain resources.

9. The method of claim 7, wherein the frequency domain resource allocation field indicates a plurality of frequency domain resources for the second data, the method further comprising:
transmitting the second data using the plurality of frequency domain resources.

10. The method of claim 1 further comprising:
transmitting the first control information comprising an indicator corresponding to a use of the second time interval or one or more time domain resource allocations, wherein a number of bits of the indicator corresponds to a number of time domain resource allocations of the one or more time domain resource allocations.

11. The method of claim 1 further comprising:
transmitting sidelink control information indicating the second time interval for transmission of the second control information and the second data and a time domain resource allocation indication for a retransmission of the first control information and the first data, wherein the first control information comprises the sidelink control information and the time domain resource allocation indication.

12. The method of claim 11 further comprising:
transmitting the retransmission according to the time domain resource allocation indication prior to the second control information and the second data.

13. The method of claim 1 further comprising:
transmitting a time domain resource allocation indicating the second time interval and a third time interval for a retransmission of the first control information and the first data, wherein the first control information comprises the time domain resource allocation.

14. The method of claim 13 further comprising:
receiving signaling configuring a resource pool for the first UE and the second UE, wherein the time domain resource allocation corresponds to the resource pool.

15. The method of claim 1 further comprising:
determining to perform channel occupancy time sharing with the second UE based at least in part on the second time interval, a channel occupancy time length, a channel access priority class, or any combination thereof, and
transmitting, to the second UE, an indication of the channel occupancy time sharing, wherein the first control information comprises the indication.

16. The method of claim 15 further comprising:
transmitting first sidelink control information comprising the second time interval; and
transmitting second sidelink control information comprising the indication.

17. The method of claim 15 further comprising:
transmitting sidelink control information comprising the second time interval and the indication.

18. The method of claim 15, wherein determining to perform channel occupancy time sharing comprises:
determining the first UE and the second UE are within a same zone, share a unicast connection, or both.

19. The method of claim 1, wherein the first control information indicates a third time interval associated with third control information and third data, the method further comprising:
transmitting, during at least a portion of the third time interval and subsequent to the second time interval, the third control information and the third data over the sidelink shared channel, wherein the second control information indicates the third time interval.

20. The method of claim 1, wherein obtaining the channel occupancy time further comprises:
performing a channel access procedure to obtain the channel occupancy time, wherein the channel access procedure comprises a listen before talk procedure.

21. The method of claim 1 further comprising:
determining a time delay between an end of the first time interval and a beginning of the second time interval exceeds a threshold amount of time; and
applying a cyclic prefix extension to the second control information based at least in part on the time delay exceeding the threshold amount of time.

22. The method of claim 1 further comprising:
transmitting the second control information to the second UE or to another UE.

23. The method of claim 1, wherein the second data comprises a retransmission of the first data.

24. The method of claim 1, wherein the second data is different from the first data.

25. A method for wireless communication at a first user equipment (UE), comprising:
receiving, during at least a portion of a first time interval and from a second UE, first control information and first data over a sidelink shared channel during a channel occupancy time in an unlicensed frequency spectrum band, wherein the first control information comprises a frequency domain resource allocation field, the first control information received via a resource pool of the first UE, the second UE, or both, and indicating a second time interval subsequent to the first time interval; and selectively performing communications during at least a portion of the second time interval based at least in part on receiving the first control information.

26. The method of claim 25 further comprising:

receiving sidelink control information to configure the first UE with a list of subchannels associated with the sidelink shared channel, each subchannel in the list of subchannels being within the second time interval, wherein the first control information comprises the sidelink control information; and identifying one or more subchannels in the list of subchannels as unavailable for the communications based at least in part on receiving the sidelink control information.

27. The method of claim 25 further comprising:

receiving sidelink control information indicating the second time interval and a time domain resource allocation indication for a retransmission of the first control information and the first data, wherein the first control information comprises the sidelink control information and the time domain resource allocation indication; and determining to perform the communications based at least in part on receiving the sidelink control information, wherein the communications comprise receiving the retransmission of the first control information and the first data according to the time domain resource allocation indication.

28. An apparatus for wireless communication at a first user equipment (UE), comprising:

one or more memories storing processor-executable code; and one or more processors coupled with the one or more memories and individually or collectively operable to execute the code;

to cause the apparatus to:

obtain a channel occupancy time in an unlicensed frequency spectrum band for transmitting first control information and first data and second control information and second data, the first control information and the first data to be transmitted during at least a portion of a first time interval of the channel occupancy time and the second control information and the second data to be transmitted during at least a portion of a second time interval of the channel occupancy time subsequent to the first time interval;

transmit, during at least the portion of the first time interval and to a second UE, the first control information and the first data over a sidelink shared channel, the first control information indicating the second time interval;

and transmit, during at least the portion of the second time interval, the second control information and the second data over the sidelink shared channel.

29. An apparatus for wireless communication at a first user equipment (UE), comprising:

one or more memories storing processor-executable code; and one or more processors coupled with the one or more memories and individually or collectively operable to execute the code;

to cause the apparatus to:

receive, during at least a portion of a first time interval and from a second UE, first control information and first data over a sidelink shared channel during a channel occupancy time in an unlicensed frequency spectrum band, wherein the first control information comprises a frequency domain resource allocation field, the first control information received via a resource pool of the first UE, the second UE, or both, and indicating a second time interval subsequent to the first time interval; and selectively perform communications during at least a portion of the second time interval based at least in part on receiving the first control information.

* * * * *